US012748206B2

(12) United States Patent
Ohno et al.

(10) Patent No.: US 12,748,206 B2
(45) Date of Patent: Sep. 29, 2026

(54) DISPLACEMENT OUTPUT DEVICE, DISPLACEMENT OUTPUT METHOD, AND RECORDING MEDIUM

(71) Applicant: NEC Corporation, Tokyo (JP)

(72) Inventors: Shouhei Ohno, Tokyo (JP); Takakazu Ishii, Tokyo (JP); Hiromichi Hirata, Tokyo (JP); Daisuke Hashizume, Tokyo (JP); Nana Jumonji, Tokyo (JP); Kaori Iwafuchi, Tokyo (JP); Yosuke Kimura, Tokyo (JP); Chisato Sugawara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 376 days.

(21) Appl. No.: 18/282,122

(22) PCT Filed: Mar. 24, 2021

(86) PCT No.: PCT/JP2021/012332
§ 371 (c)(1),
(2) Date: Sep. 14, 2023

(87) PCT Pub. No.: WO2022/201372
PCT Pub. Date: Sep. 29, 2022

(65) Prior Publication Data
US 2024/0159890 A1 May 16, 2024

(51) Int. Cl.
*G06T 7/73* (2017.01)
*G01S 13/90* (2006.01)

(52) U.S. Cl.
CPC ............ *G01S 13/9023* (2013.01); *G06T 7/73* (2017.01); *G06T 2207/30184* (2013.01)

(58) Field of Classification Search
CPC ....... G01S 13/9023; G01S 13/90; G06T 7/73; G06T 2207/30184; G06T 2207/10044; G06T 1/00; G06T 7/246; G01C 7/02
See application file for complete search history.

(56) References Cited

FOREIGN PATENT DOCUMENTS

| | | | |
|---|---|---|---|
| JP | 2002-156902 | A | 5/2002 |
| JP | 2011-158278 | A | 8/2011 |

(Continued)

OTHER PUBLICATIONS

International Search Report for PCT Application No. PCT/JP2021/012332, mailed on May 25, 2021.

(Continued)

*Primary Examiner* — Resha Desai
*Assistant Examiner* — Bongani Jabulani Mashele
(74) *Attorney, Agent, or Firm* — Sughrue Mion, PLLC

(57) ABSTRACT

A displacement output device according to the present invention includes: a memory; and at least one processor coupled to the memory. The processor performing operations. The operations include: acquiring a first ground surface displacement at a first point from a synthetic aperture radar; estimating a second ground surface displacement at a second point different from the first point using the acquired first ground surface displacement; clipping at least one of the first ground surface displacement and the second ground surface displacement included in a preset first region from the first ground surface displacement and the second ground surface displacement; and outputting at least one of the first ground surface displacement and the second ground surface displacement included in the first region.

18 Claims, 22 Drawing Sheets

(56) References Cited

FOREIGN PATENT DOCUMENTS

| | | | | | |
|---|---|---|---|---|---|
| JP | 2015-021823 | A | | 2/2015 | |
| JP | 2018054540 | A | * | 4/2018 | |
| JP | 2020020740 | A | * | 2/2020 | ......... G01S 13/9027 |
| JP | 2021021703 | A | * | 2/2021 | |

OTHER PUBLICATIONS

English translation of Written opinion for PCT Application No. PCT/JP2021/012332, mailed on May 25, 2021.

* cited by examiner

DISPLACEMENT OUTPUT DEVICE, DISPLACEMENT OUTPUT METHOD, AND RECORDING MEDIUM

This application is a National Stage Entry of PCT/JP2021/012332 filed on Mar. 24, 2021, the contents of all of which are incorporated herein by reference, in their entirety.

TECHNICAL FIELD

The present invention relates to processing of information, and particularly to processing of information about a ground surface displacement.

BACKGROUND ART

As a technique for measuring a ground surface displacement, a synthetic aperture radar (SAR), in particular, an interference SAR is used (see, for example, PTL 1.).

A ground surface displacement visualization device (hereinafter, referred to as a "visualization device".) described in PTL 1 generates ground surface displacement based on time-series image data received from the SAR mounted on an artificial satellite. Then, the visualization device extracts the region of interest in the generated displacement. Furthermore, the visualization device divides the extracted region of interest into predetermined ranges to generate divided regions. Then, the visualization device calculates a representative value of the displacement of each divided region and a standard deviation of the displacement. Then, the visualization device displays the representative value and the standard deviation that are results of the calculation. Other related documents include PTL 2 and PTL 3.

CITATION LIST

Patent Literature

PTL 1: JP 2018-054540 A
PTL 2: JP 2011-158278 A
PTL 3: JP 2002-156902 A

SUMMARY OF INVENTION

Technical Problem

The measurement of the ground surface displacement using the interference SAR calculates a difference in a plurality of SAR images measured at different times. In order to improve the accuracy of the difference to be calculated, interference SAR analysis (also referred to as "PS interference SAR analysis") using persistent scatterer (PS) points is used. However, a structure having a flat face such as a road surface may not be able to acquire PS points because backscattering is weak. For example, when displacement of a region including a road is acquired using the interference SAR, there is a case where the ground surface displacement of a road portion cannot be acquired. There may be a point where it is desired to avoid the output of the ground surface displacement from the viewpoint of privacy.

The technique described in PTL 1 is a technique for displaying displacement of a ground surface acquired using the SAR in an easy-to-understand manner. However, PTL 1 does not disclose a technique related to a point where the ground surface displacement cannot be acquired. PTL 1 does not disclose whether to output the ground surface displacement at a predetermined point.

An object of the present invention is to solve the above problem and provide a displacement output device or the like that outputs a ground surface displacement of a region including a point where the ground surface displacement cannot be acquired in the SAR while avoiding an output of the ground surface displacement in a predetermined region.

Solution to Problem

A displacement output device according to an aspect of the present invention includes: a displacement acquisition means configured to acquire a first ground surface displacement at a first point from a synthetic aperture radar; a displacement estimation means configure to estimate a second ground surface displacement at a second point different from the first point using the acquired first ground surface displacement; a displacement clipping means configured to clip at least one of the first ground surface displacement and the second ground surface displacement included in a preset first region from the first ground surface displacement and the second ground surface displacement; and an output means configured to output at least one of the first ground surface displacement and the second ground surface displacement included in the first region.

A displacement output system according to an aspect of the present invention includes: the above displacement output device; a synthetic aperture radar that outputs a first ground surface displacement to a displacement output device; and a display device that displays at least one of the first ground surface displacement and the second ground surface displacement output by the displacement output device.

A displacement output method according to an aspect of the present invention includes: acquiring a first ground surface displacement at a first point from a synthetic aperture radar; estimating a second ground surface displacement at a second point different from the first point using the acquired first ground surface displacement; clipping at least one of the first ground surface displacement and the second ground surface displacement included in a preset first region from the first ground surface displacement and the second ground surface displacement; and outputting at least one of the first ground surface displacement and the second ground surface displacement included in the first region.

A displacement output method according to an aspect of the present invention includes: executing, by a displacement output device, the displacement output method described above; outputting, by the synthetic aperture radar, the first ground surface displacement to the displacement output device; and displaying, by a display device, at least one of the first ground surface displacement and the second ground surface displacement output by the displacement output device.

A recording medium according to an embodiment of the present invention records a program for causing a computer to execute: a process of acquiring a first ground surface displacement at a first point from a synthetic aperture radar; a process of estimating a second ground surface displacement at a second point different from the first point using the acquired first ground surface displacement; a process of clipping at least one of the first ground surface displacement and the second ground surface displacement included in a preset first region from the first ground surface displacement and the second ground surface displacement; and a process of outputting at least one of the first ground surface displacement and the second ground surface displacement included in the first region.

Advantageous Effects of Invention

According to the present invention, it is possible to achieve an effect of outputting ground surface displacement of a region including a point where the ground surface displacement cannot be acquired in the SAR while avoiding outputting the ground surface displacement in a predetermined region.

EXAMPLE EMBODIMENT

Figure 1:
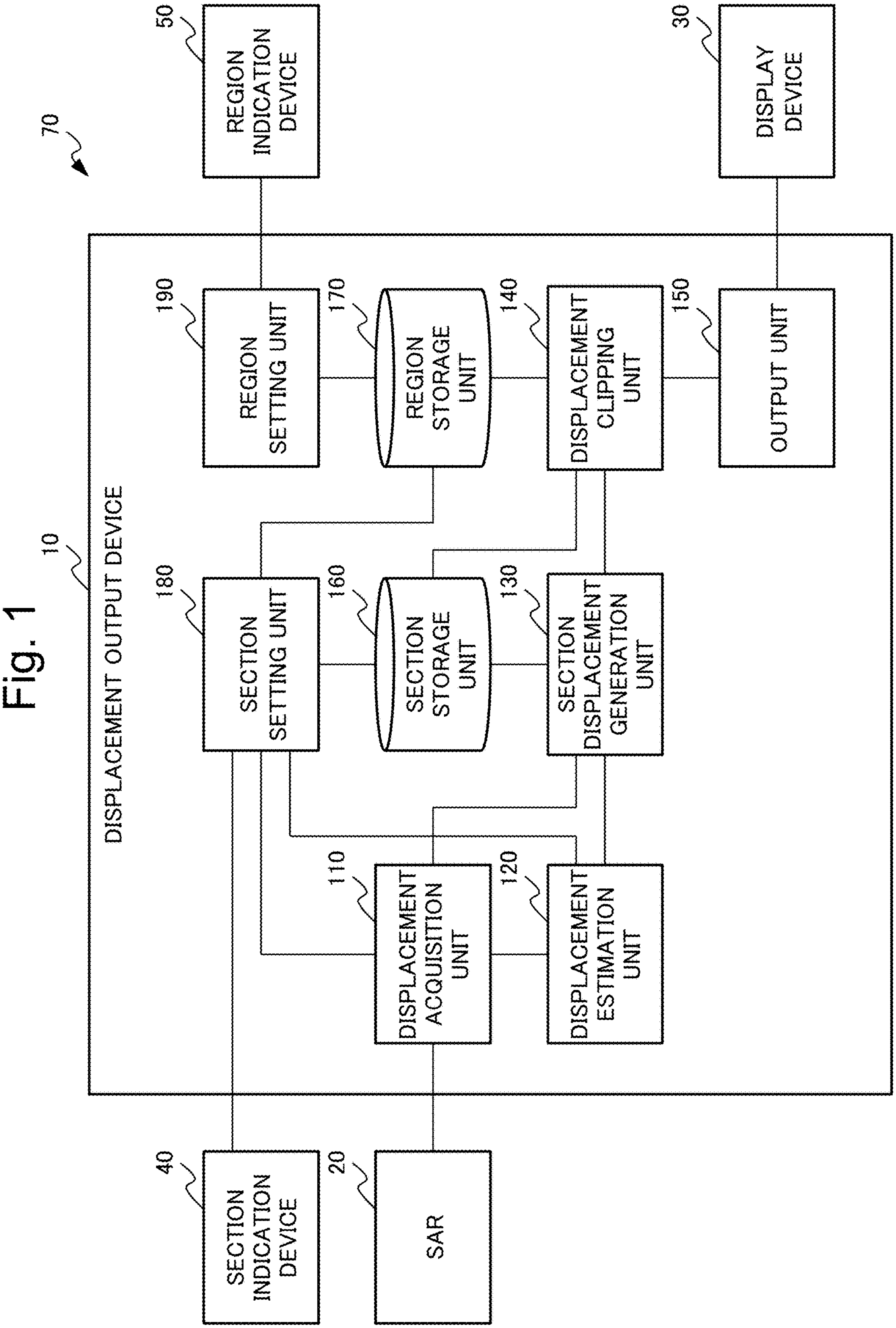
FIG. 1 is a block diagram illustrating an example of a configuration of a displacement output system according to the first example embodiment.

Next, an example embodiment of the present invention will be described with reference to the drawings. Each drawing is for describing an example embodiment of the present invention. However, the example embodiment of the present invention is not limited to the description of each drawing. Similar configurations in the respective drawings are denoted by the same reference numerals, and repeated description thereof may be omitted.

First Example Embodiment

Terms

A "synthetic aperture radar (SAR)" is a radar that transmits and receives radio waves while a flying object (such as an artificial satellite or an airplane) is moving, and obtains an image equivalent to that in the case of an antenna having a large aperture. The resolution in radar observation is improved as the antenna is increased. However, the size of an antenna that can be mounted on an artificial satellite or the like is limited. Therefore, the SAR uses an antenna having a small actual aperture length to transmit and receive radio waves while flying (that is, by artificially "synthesizing" the "aperture"), thereby improving resolution in the traveling direction (that is, a virtually large antenna is configured.).

The "interference SAR" is a technique for performing two observations using the SAR for the same point on the ground surface, and measuring a difference in distance (ground surface displacement (for example, subsidence or upheaval)) to each point on the ground surface between two observations from a difference in "phase" of two reflected waves. Specifically, the interference SAR measures displacement of a distance to a structure on the ground surface (the ground surface supporting the foundation of the structure) as a ground surface displacement. However, in general, the deformation of the structure is smaller than the change in the ground. The interference SAR uses a noise removal technique based on various factors. Therefore, in the following description, the displacement of the distance measured using the interference SAR is considered as the displacement of the surface of the ground (that is, the ground surface) on which the structure is based.

The "persistent scatterer (PS) point" is an observation point including an object such as a building in which backscattering is strong and stable in measurement of the ground surface displacement using the interference SAR. The PS point may also be referred to as a "permanent scatterer point".

[Description of Configuration]

Next, a configuration of a displacement output system 70 according to a first example embodiment will be described with reference to the drawings. FIG. 1 is a block diagram illustrating an example of a configuration of the displacement output system 70 according to the first example embodiment. The displacement output system 70 includes a displacement output device 10, a synthetic aperture radar (SAR) 20, a display device 30, a section indication device 40, and a region indication device 50.

The displacement output system 70 may include a plurality of at least any devices. For example, the displacement output system 70 may include a plurality of display devices 30. For example, the displacement output system 70 may use, as the display device 30, a display installed at a management base of a structure and a display of a terminal device carried by a worker. The devices included in the displacement output system 70 are connected via a predetermined communication path (for example, the Internet or a public telephone line). The communication path may be wired, wireless, or a combination of wired and wireless.

The SAR 20 is a device or system that observes the ground surface displacement in a predetermined range including a structure to be determined (for example, a road), using the SAR (for example, the interference SAR) to output the observed ground surface displacement to the displacement output device 10. More specifically, the SAR 20 analyzes observation results (for example, SAR image) at different points in time to determine the ground surface displacement at each point. Then, the SAR 20 outputs the determined ground surface displacement to the displacement output device 10. Specifically, the SAR 20 outputs, as the ground surface displacement, information including the position of the point where the ground surface displacement is determined and the value of the determined ground surface displacement. However, in the following description, for convenience of description, the position of the point where the ground surface displacement is determined and the value of the determined ground surface displacement are collectively referred to as a "ground surface displacement" unless a particularly distinguished description is necessary.

The observation range of the SAR 20 may include a point where the ground surface displacement cannot be determined. The SAR 20 does not output the ground surface displacement for a point where the ground surface displacement cannot be determined. Alternatively, the SAR 20 may output information indicating that the ground surface displacement cannot be determined for a point where the ground surface displacement cannot be determined. As described above, the ground surface displacement output by the SAR 20 may include a missing displacement.

The displacement output device 10 may include a configuration (not illustrated) that acquires a measurement result (for example, SAR image) from the SAR 20 and analyzes the ground surface displacement using the acquired measurement result. In this case, the SAR 20 may output an observation result (for example, SAR image) to the displacement output device 10.

The display device 30 includes display equipment such as a liquid crystal display, and displays information (ground surface displacement or the like) acquired from the displacement output device 10. The displacement output system 70 may include any device as the display device 30. For example, the display device 30 may be a display included in a local government system that manages a structure (for example, a road). Alternatively, the display device 30 may be a display of a terminal device (for example, a smartphone) carried by the user who checks the state of the structure.

The section indication device 40 outputs information (for example, the position of the section) related to the section to the displacement output device 10. Alternatively, section indication device 40 may output information (for example, a method of setting a section or a condition of a section) for setting a section to displacement output device 10. The section will be further described later.

The region indication device 50 outputs information (for example, the position of the region) related to a region from which the ground surface displacement is clipped to the displacement output device 10. Alternatively, the region indication device 50 may output, to the displacement output device 10, information related to a region in which the ground surface displacement is protected (a region in which the ground surface displacement is not output). The region will be further described later.

Some or all of the display device 30, the section indication device 40, and the region indication device 50 may be included in the same device. For example, when the structure to be determined is a road, a server that manages the road may operate as the display device 30, the section indication device 40, and the region indication device 50. Alternatively, some or all of the display device 30, the section indication device 40, and the region indication device 50 may be included in the displacement output device 10. Alternatively, any of the display device 30, the section indication device 40, and the region indication device 50 may include the displacement output device 10.

The displacement output device 10 acquires the ground surface displacement from the SAR 20. The displacement output device 10 may include a configuration for generating the ground surface displacement by analyzing a measurement result (for example, SAR image) of the SAR 20. The ground surface displacement output by the SAR 20 may include a missing displacement. Therefore, the displacement output device 10 estimates the ground surface displacement at the point where the ground surface displacement cannot be acquired using the acquired (or generated) ground surface displacement. Then, the displacement output device 10 generates the ground surface displacement of the predetermined section using the acquired ground surface displacement and the estimated ground surface displacement. Then, the displacement output device 10 clips a ground surface displacement of a predetermined region from the generated ground surface displacement of the section. Then, the displacement output device 10 outputs the clipped ground surface displacement to a predetermined device (for example, the display device 30). In the above operation, the displacement output device 10 may acquire information related to the section from a predetermined device (for example, section indication device 40). Alternatively, in the above operation, the displacement output device 10 may acquire information related to the region from a predetermined device (for example, region indication device 50). The displacement output device 10 will be further described later.

Figure 2:
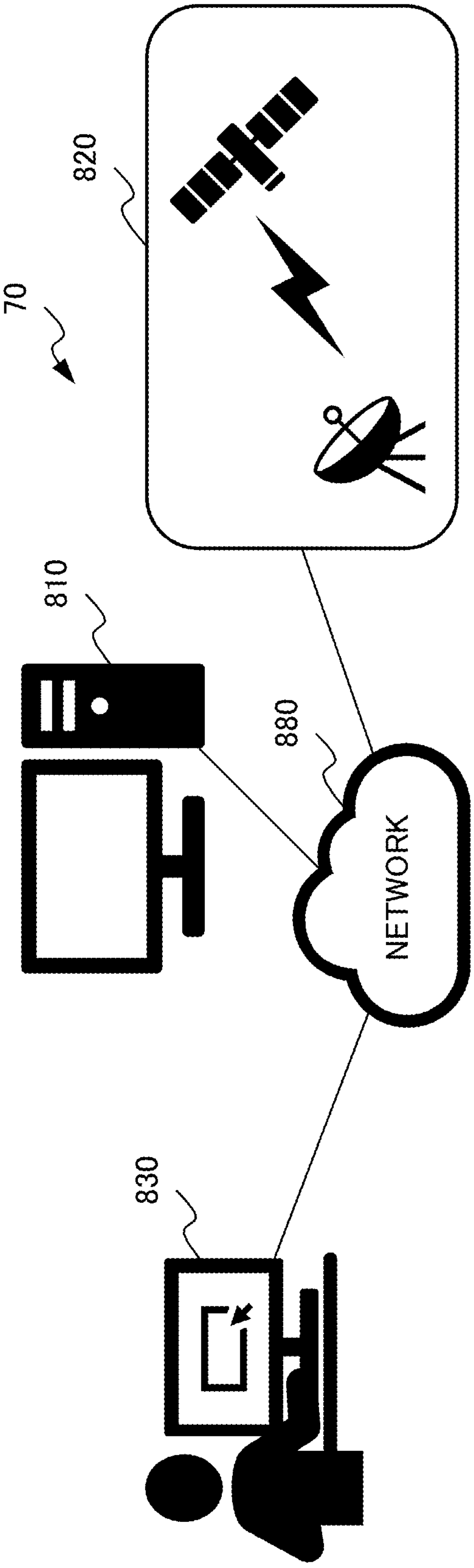
FIG. 2 is a diagram illustrating an example of a specific configuration of the displacement output system.

FIG. 2 is a diagram illustrating an example of a specific configuration of the displacement output system 70. The displacement output system 70 of FIG. 2 includes a computer 810 as an example of the displacement output device 10, and a SAR system 820 that includes an artificial satellite and a ground station as an example of the SAR 20. Further, the displacement output system 70 includes a terminal device 830 as the display device 30. The terminal device 830 may operate as the section indication device 40 and the region indication device 50. Furthermore, FIG. 2 illustrates a network 880 as a communication path connecting each device and the system. The network 880 is a communication path that connects each device and the system to each other. The network 880 is not particularly limited as long as each device and the system can be connected. For example, the network 880 may be the Internet, a public telephone line, or a combination thereof.

The SAR system 820 determines the ground surface displacement based on the SAR image acquired using the artificial satellite to output the determined ground surface displacement to the computer 810. The computer 810 estimates a missing ground surface displacement using the acquired ground surface displacement. Then, the computer 810 generates the ground surface displacement of a predetermined section using the acquired ground surface displacement and the estimated ground surface displacement. Then, the computer 810 clips a ground surface displacement of a predetermined region from the ground surface displacement of the section. Then, the computer 810 outputs the clipped ground surface displacement to the terminal device 830. The computer 810 may acquire information related to at least one of the section and the region from the terminal device 830 in generating the ground surface displacement of the section and clipping the ground surface displacement of the region. The terminal device 830 displays the ground surface displacement acquired from the computer 810.

The computer 810, the SAR system 820, and the terminal device 830 included in the displacement output system 70 are not particularly limited. As the computer 810, the SAR system 820, and the terminal device 830, generally available products and systems may be used. Therefore, a detailed description thereof will be omitted.

Next, a configuration of a displacement output device 10 according to a first example embodiment will be described with reference to FIG. 1. The displacement output device 10 includes a displacement acquisition unit 110, a displacement estimation unit 120, a section displacement generation unit 130, a displacement clipping unit 140, an output unit 150, a section storage unit 160, a region storage unit 170, a section setting unit 180, and a region setting unit 190.

In the following description, each configuration directly exchanges information. However, this does not limit the operation of each configuration. Each configuration may exchange information via an information storage unit (not illustrated), for example. For example, each configuration may store the acquired or generated information in the information storage unit, and acquire necessary information from the information storage unit. However, in the following description, for convenience of description, information exchange between configurations will be described in a direct exchange except for a case where description is particularly necessary.

The displacement acquisition unit 110 acquires the ground surface displacement from the SAR 20. Hereinafter, the ground surface displacement acquired from the SAR 20 is referred to as "acquired displacement" or a "first ground surface displacement". A point where the ground surface displacement has been acquired from the SAR 20 is referred to as an "acquisition point" or a "first point". For example, the acquisition point is a PS point. However, the acquisition point is not limited to the PS point.

The displacement output device 10 may include a configuration (not illustrated) that acquires a measurement result (for example, SAR image) from the SAR 20, and analyzes the acquired measurement result to generate the ground surface displacement. In this case, displacement acquisition unit 110 may acquire the ground surface displacement from the configuration. Therefore, in the following description, the acquired displacement (first ground surface displacement) includes a ground surface displacement generated by a configuration (not illustrated) included in the displacement output device 10 using the measurement result of the SAR 20.

Figure 3:
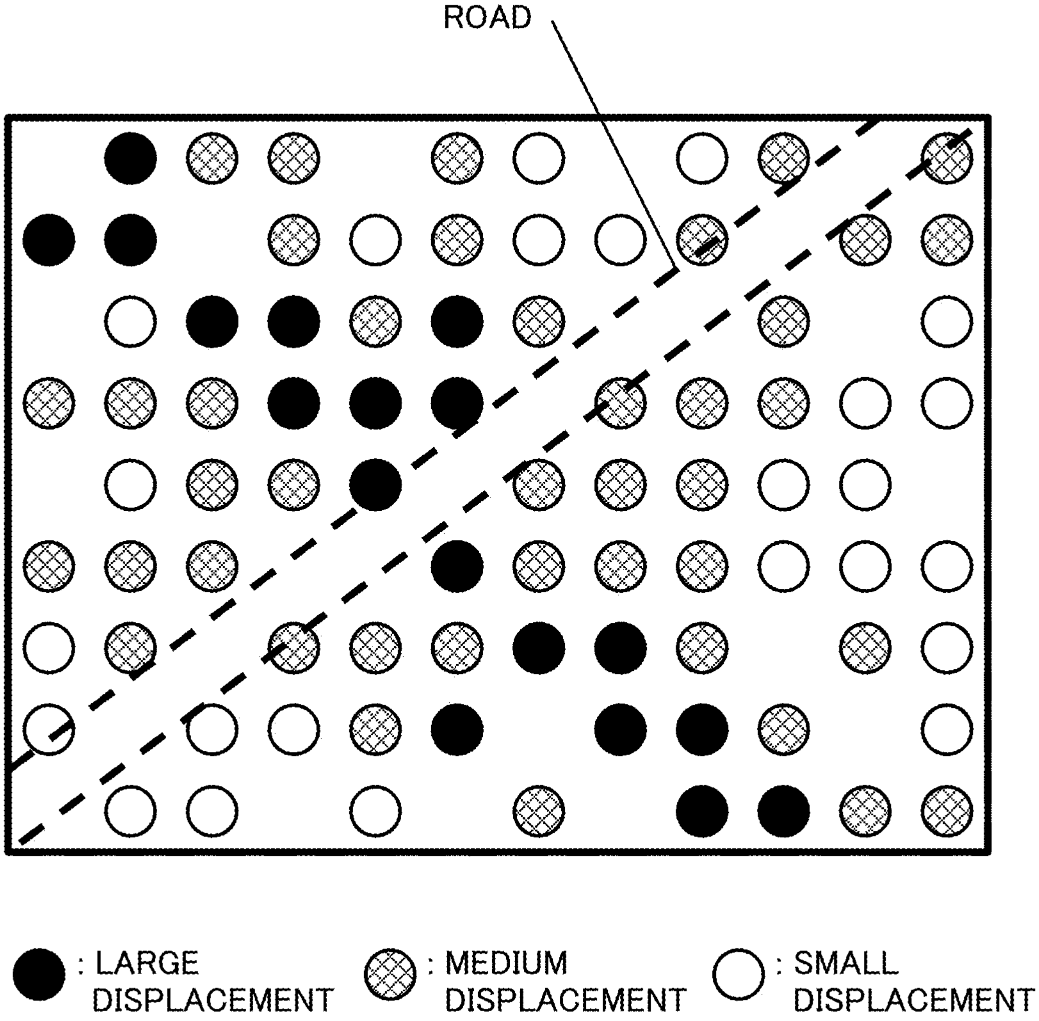
FIG. 3 is a diagram illustrating an example of an acquired ground surface displacement.

FIG. 3 is a diagram illustrating an example of the acquired ground surface displacement (acquired displacement). In FIG. 3, the magnitude of the ground surface displacement is divided into three (large, medium, and small), and the display is changed according to the magnitude of the ground surface displacement. However, this does not limit the division of the ground surface displacement. The division of the ground surface displacement may be appropriately determined by the user in accordance with the use scene. For example, the number of divisions of the magnitude of the ground surface displacement may be two or four or more.

SAR 20 may not be able to the acquire the ground surface displacement at some points. The points have the missing ground surface displacement. For example, the road may not include a structure serving as a PS point. In such a case, the SAR 20 is unable to acquire the ground surface displacement on the road. FIG. 3 illustrates a position of a road using a broken line for reference. In the example illustrated in FIG. 3, the SAR 20 has not been able to acquire the ground surface displacement at least at the location of the road. As described above, the ground surface displacement (acquired displacement) acquired from the SAR 20 may be missing at least at some points. The description returns to the description with reference to FIG. 1.

The displacement estimation unit 120 estimates the ground surface displacement at a point where the ground surface displacement cannot be acquired, using the acquired displacement (first ground surface displacement). Hereinafter, the ground surface displacement estimated using the acquired displacement is referred to as an "estimated displacement" or a "second ground surface displacement". A point where the ground surface displacement is estimated is referred to as an "estimation point" or a "second point". The estimation point (second point) may be a point that is not included in the range in which the SAR 20 measures the ground surface displacement as long as the ground surface displacement can be estimated using the acquired displacement. For example, the estimation point may be points (for example, adjacent points surrounding the measurement range) around the measurement range of the SAR 20. As a matter of course, the estimation point (second point) is a point different from the acquisition point (first point).

A method used by the displacement estimation unit 120 to estimate the ground surface displacement is any method. For example, displacement estimation unit 120 may estimate the ground surface displacement (estimated displacement) at the estimation point using the ground surface displacement (acquired displacement) at the acquisition point included in the predetermined range in the vicinity of the estimation point. However, displacement estimation unit 120 may estimate the ground surface displacement (estimated displacement) at the estimation point using not only the vicinity of the estimation point but also the acquired displacement having a predetermined positional relationship or all the acquired displacements. For example, the displacement estimation unit 120 may use an inverse distance weighted (IDW) method, a kriging (Kriging) method, a natural neighbor interpolation method, or a spline interpolation method. The displacement estimation unit 120 may use not only an interpolation technique, but also an extrapolation technique. For example, for a point at the upper left in FIG. 3 where the ground surface displacement cannot be measured, the ground surface displacement at positions that sandwich the point cannot be acquired. Therefore, the displacement estimation unit 120 uses the extrapolation method instead of the interpolation method to estimate the ground surface displacement at this point. The displacement estimation unit 120 may store a plurality of estimation techniques and select an estimation technique related to the estimation point. For example, displacement estimation unit 120 may select the estimation technique based on a position of the estimation point (for example, the end or center of the measurement range of the SAR 20) or a state of the acquisition point near the estimation point (for example, the number of acquisition points or the distribution state (density of distribution or bias of distribution)).

Figure 4:
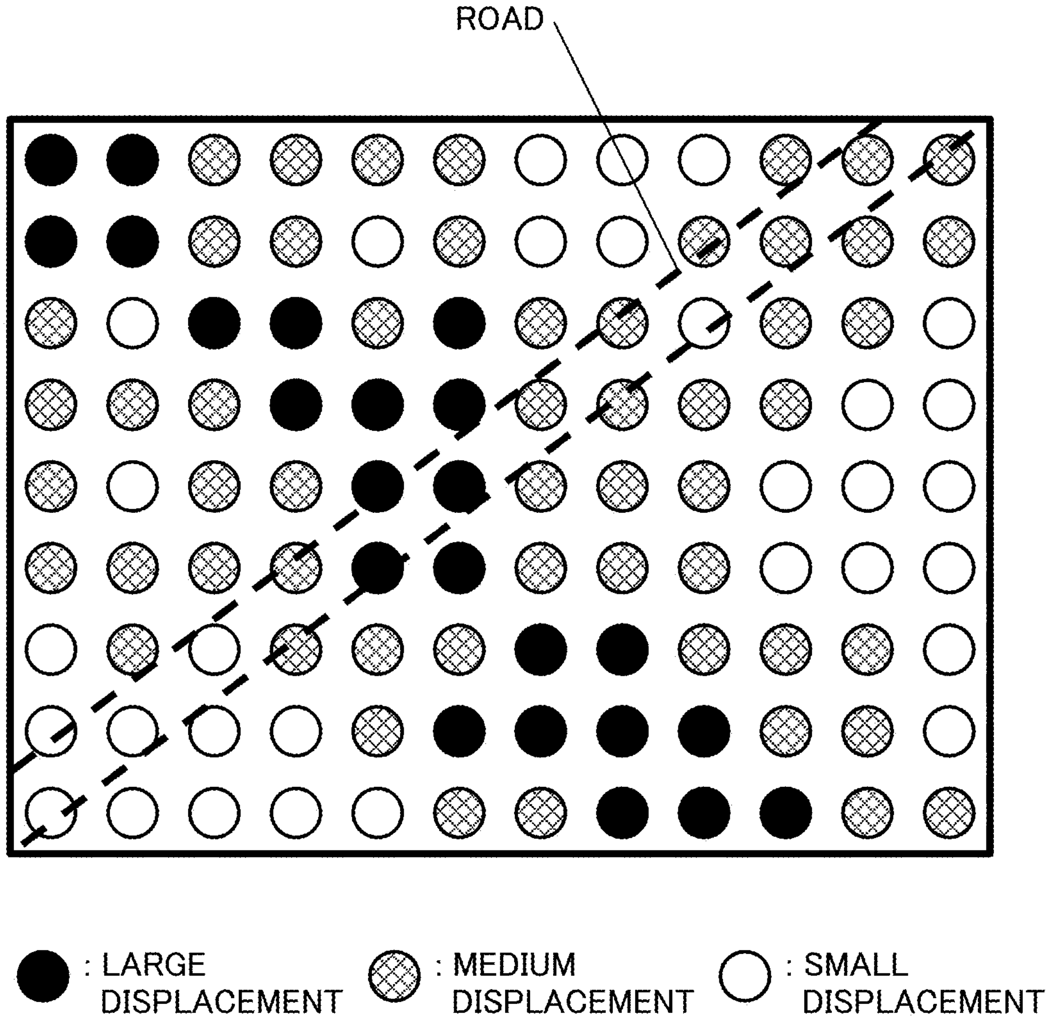
FIG. 4 is a diagram illustrating an example in which the estimated ground surface displacement is added to the ground surface displacement illustrated in FIG. 3.

FIG. 4 is a diagram illustrating an example in which the estimated ground surface displacement is added to the ground surface displacement illustrated in FIG. 3. FIG. 4 illustrates the ground surface displacement (estimated displacement) estimated by the displacement estimation unit 120 at points (for example, the lower left point and the upper left point) where there is no ground surface displacement in FIG. 3. The description returns to the description with reference to FIG. 1.

The section storage unit 160 stores one or a plurality of sections used by the section displacement generation unit 130. The "section" is a range of the ground surface including at least one of the acquisition point and the estimation point. The user may want to refer to the ground surface displacement in a spatial resolution that is different from a spatial resolution in the measurement of the SAR 20. Alternatively, a structure often occupies a larger range on the ground surface than the spatial resolution of the SAR 20. Therefore, the structure is affected by the ground surface displacement at the plurality of points. Therefore, it may be desirable that the ground surface displacement used for determining the structure be a ground surface displacement acquired by collecting the acquired and estimated ground surface displacements in a certain number or a certain range.

Therefore, the displacement output device 10 handles the ground surface displacement in the section in which the ground surface displacement at the plurality of points is collected. Specifically, the displacement output device 10 sets a section including a plurality of points, and generates the ground surface displacement at the section using the ground surface displacement of the points included in the set section. However, the displacement output device 10 may use a section including one point. For example, when a plurality of sections is used, at least some of the sections may be sections including one acquisition point or one estimation point.

The section setting unit 180 sets sections and stores the sections in the section storage unit 160. A method of setting the section used by the section setting unit 180 is any method. For example, the section setting unit 180 may acquire the position and the size (or shape) of the section from a predetermined device (for example, section indication device 40) as an instruction from the user, and store the acquired position and size in the section storage unit 160. For example, in a case where the section is a quadrangle, the section setting unit 180 may acquire positions (for example, latitude and longitude) of four vertexes of each section.

Alternatively, the section setting unit 180 may acquire information about a structure to be determined of the ground surface displacement as an instruction from the user, and set the section using the acquired information about the structure. For example, when the structure to be determined is a road, the section setting unit 180 may set a section using at least one of the position, the width, the length, and the width (or range) of the road.

Alternatively, the section setting unit 180 may acquire a section setting method (for example, a predetermined setting rule) as an instruction from the user, and set the section using the acquired method. For example, the section setting unit 180 may set a section in such a way that a predetermined number of ground surface displacements (acquired displacements and estimated displacements) are included. More specifically, the section setting unit 180 may set a section whose length is a predetermined multiple of the spatial resolution of the SAR 20. For example, the section setting unit 180 may use, as the section, a square one side length of which is four times the spatial resolution of the SAR 20. In this case, the setting rule of the section is, for example, "including the ground surface displacement having 16 points". As described above, the section setting unit 180 may set a section using the spatial resolution of the SAR 20.

Alternatively, the section setting unit 180 may divide (grid) the designated range and set the sections. For example, the section setting unit 180 may acquire, as a user's instruction, positions of vertexes of a quadrangle that is a range in which sections are set, and the number of sections (that is, the number of divisions of each side of the quadrangle) set in each of two directions of the quadrangle. In this case, the section setting unit 180 may divide (grid) the acquired quadrangle into the acquired number to set the sections.

The user may want to use a predetermined spatial resolution as the display of the ground surface displacement. Therefore, the section setting unit 180 may acquire the spatial resolution of the section as an instruction from the user, and set the section related to the acquired spatial resolution. When there is a plurality of sections, the sizes of all the sections may be the same, or the size of at least some of the sections may be different from that of the other sections. The shapes of all the sections may be the same, and the shape of at least some of the sections may be different from that the other sections.

Alternatively, the section setting unit 180 may set the section using a predetermined condition. For example, the section setting unit 180 may set the section in such a way as to be related to the administrative section. Alternatively, the section setting unit 180 may set the section in such a way as to include a predetermined point. Alternatively, the section setting unit 180 may set the section in such a way that at least one of the acquisition point and the estimation point included in the section satisfies a predetermined condition.

The estimated displacement is estimated using the acquired displacement. Therefore, in general, the estimated displacement is likely to have a larger error than the acquired displacement. Therefore, for example, the section setting unit 180 may set the section in such a way that the number of acquisition points included in the sections falls within a predetermined range (for example, equal to or more than a predetermined threshold value), or in such a way that the ratio of the acquisition points included in the sections falls within a predetermined range (for example, equal to or more than a predetermined threshold value). Alternatively, the section setting unit 180 may set the sections in such a way that the number of estimation points included in the sections falls within a predetermined range (for example, equal to or less than a predetermined threshold value), or in such a way that the ratio of the estimation points included in the sections falls within a predetermined range (for example, equal to or less than a predetermined threshold value). As described above, the section setting unit 180 may use, as the predetermined condition, a condition related to at least one of the number or the ratio of acquisition points or the number or the ratio of estimation points included in the section.

Figure 5:
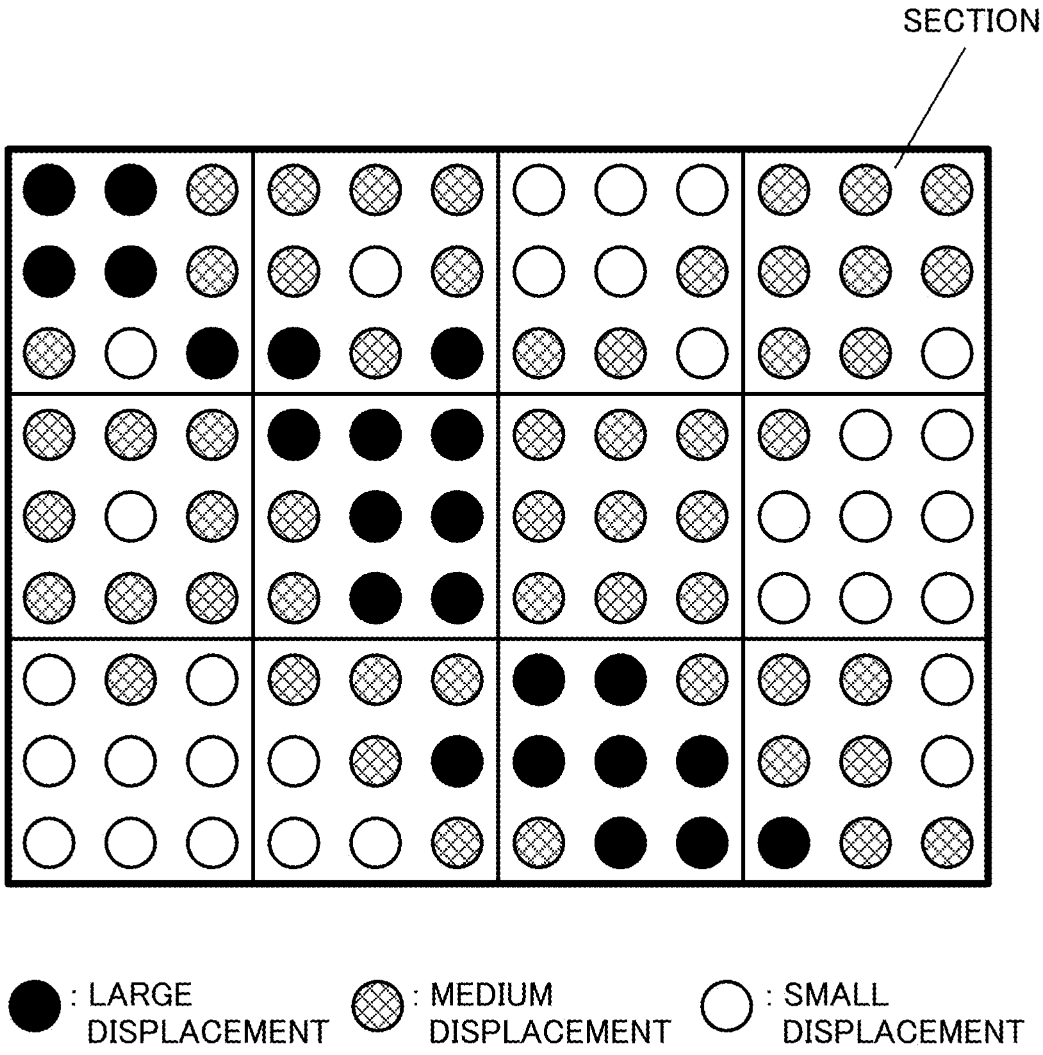
FIG. 5 is a diagram illustrating an example of a section.

The section setting unit 180 may set the section using information different from the acquired displacement and the estimated displacement. For example, a region of interest to be described later is a region for outputting the ground surface displacement. Therefore, the section setting unit 180 may set the section using the region of interest. For example, the section setting unit 180 may set the sections in such a way that all the sections or sections having equal to or more than a predetermined ratio include the region of interest. Alternatively, the section setting unit 180 may set the sections in such a way that the ratio of the area of the region of interest included in the sections falls within a predetermined range (for example, more than a predetermined threshold value). FIG. 5 is a diagram illustrating an example of a section. The section illustrated in FIG. 5 is a section including nine ground surface displacements without distinguishing between the acquired displacement and the estimated displacement. The description returns to the description with reference to FIG. 1.

Figure 6:
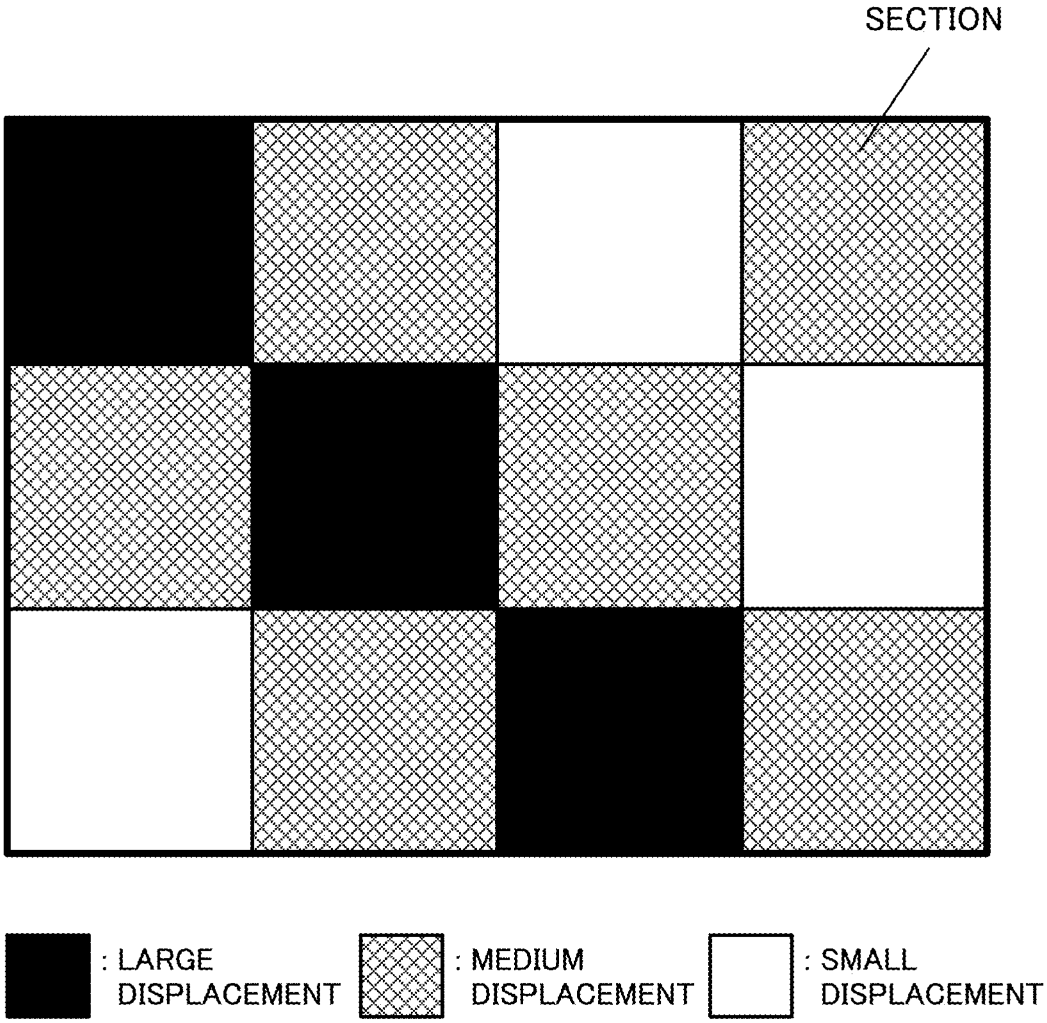
FIG. 6 is a diagram illustrating an example of section displacement.

The section displacement generation unit 130 generates the ground surface displacement of the section using the ground surface displacement (acquired displacement and estimated displacement) included in the section. Hereinafter, the ground surface displacement of the section is referred to as "section displacement" or "third ground surface displacement". A method for generating the section displacement by the section displacement generation unit 130 is any method. For example, the section displacement generation unit 130 may use, as the section displacement, an average value, a median value, a most frequent value, a maximum value, or a minimum value of the ground surface displacement at the points included in the section. Alternatively, the section displacement generation unit 130 may use, as the section displacement, an average value (predetermined weighted average value) in which different weights are set for the central portion and the peripheral portion of the section. Alternatively, section displacement generation unit 130 may use an average value in which different weights are set for the acquired displacement and the estimated displacement included in the section. The section displacement generation unit 130 may correct the generated section displacement. For example, the section displacement generation unit 130 may correct the generated section displacement using the surrounding section displacement. FIG. 6 is a diagram illustrating an example of section displacement. FIG. 6 is section displacement related to each section illustrated in FIG. 5. The description returns to the description with reference to FIG. 1.

The section setting unit 180 may output the set section to the section displacement generation unit 130. In this case, the displacement output device 10 may not include the section storage unit 160. Alternatively, the displacement output device 10 may acquire a section from an external device (not illustrated) in advance and store the section in the section storage unit 160. In this case, the displacement output device 10 may not include the section setting unit 180. Alternatively, the section displacement generation unit 130 may acquire the section from an external device (not illustrated). In this case, the displacement output device 10 may not include the section setting unit 180 and the section storage unit 160. Alternatively, the section displacement generation unit 130 may use a preset section. Also in this case, the displacement output device 10 may not include the section setting unit 180 and the section storage unit 160.

The region storage unit 170 stores one or a plurality of regions used by the displacement clipping unit 140 to clip the ground surface displacement. Hereinafter, a region from which the ground surface displacement is clipped is referred to as a "region of interest" or a "first region". A region for which the ground surface displacement is not clipped or a region for which the ground surface displacement is protected is referred to as a "protection region". That is, the "protection region" is a region that is not the "region of interest (first region)". The region storage unit 170 may store the region of interest, may store the protection region, or may store both the region of interest and the protection region.

The region setting unit 190 sets at least one of the region of interest and the protection region and stores the set region in the region storage unit 170. A region excluding the protection region is the region of interest. For example, in a case where the protection region is set, the displacement output device 10 can execute the operation using the region of interest by extracting a region other than the protection region. Conversely, in a case where the region of interest is set, the displacement output device 10 can execute the operation using the protection region by extracting a region other than the region of interest. As described above, even when either the protection region or the region of interest is set, the displacement output device 10 can easily execute both the operation using the protection region and the operation using the region of interest. Therefore, in the following description, for convenience of description, the setting of the region of interest includes the setting of the protection region unless a particularly distinguished description is necessary. For example, when setting the protection region, the region setting unit 190 may operate by replacing the "region of interest" in the setting of the "region of interest" in the following description with the "protection region".

A method of setting the region by the region setting unit 190 is any method. For example, the region setting unit 190 may acquire the position and the size of the region of interest from a predetermined device (for example, region indication device 50) as an instruction from the user. Alternatively, the region setting unit 190 may acquire information related to a region to be set as the region of interest as an instruction from the user. For example, in a case where the displacement output device 10 stores map information in advance, the region setting unit 190 may acquire information (for example, an identifier of a road in map information) about a region (for example, a region of a road) set as a region of interest in the map information.

Alternatively, the region setting unit 190 may acquire information for setting the region of interest as an instruction from the user. For example, when a region of a road is set using map information as a region of interest, the region setting unit 190 may acquire information about a server that stores the map information (for example, the address of the server) and information indicating a road in the map information (for example, an identifier of a road). In this case, the region setting unit 190 may acquire the map information from the server using the acquired information about the server, extract the position of the road in the map information using the information indicating the road, and collectively set the position of the extracted road as the region of interest.

The region of interest is any region. For example, the region of interest may be a structure (for example, a road, a bridge, or a platform) through which a vehicle or the like passes. Alternatively, the region of interest may be a structure (for example, a runway) through which an object other than the vehicle passes. Alternatively, the region of interest may be a region having a certain size such as a parking lot, a park, a square, a temple, an agricultural land, or a cemetery. Alternatively, the region of interest may be a region of a specific building, such as a convention center or a factory. The protection region is any region. For example, the protection region may be a region where a building (individual residence or factory) requiring privacy protection is constructed. Alternatively, the protection region may be a region where provision of information is legally restricted (for example, embassy or military facilities).

Figure 7:
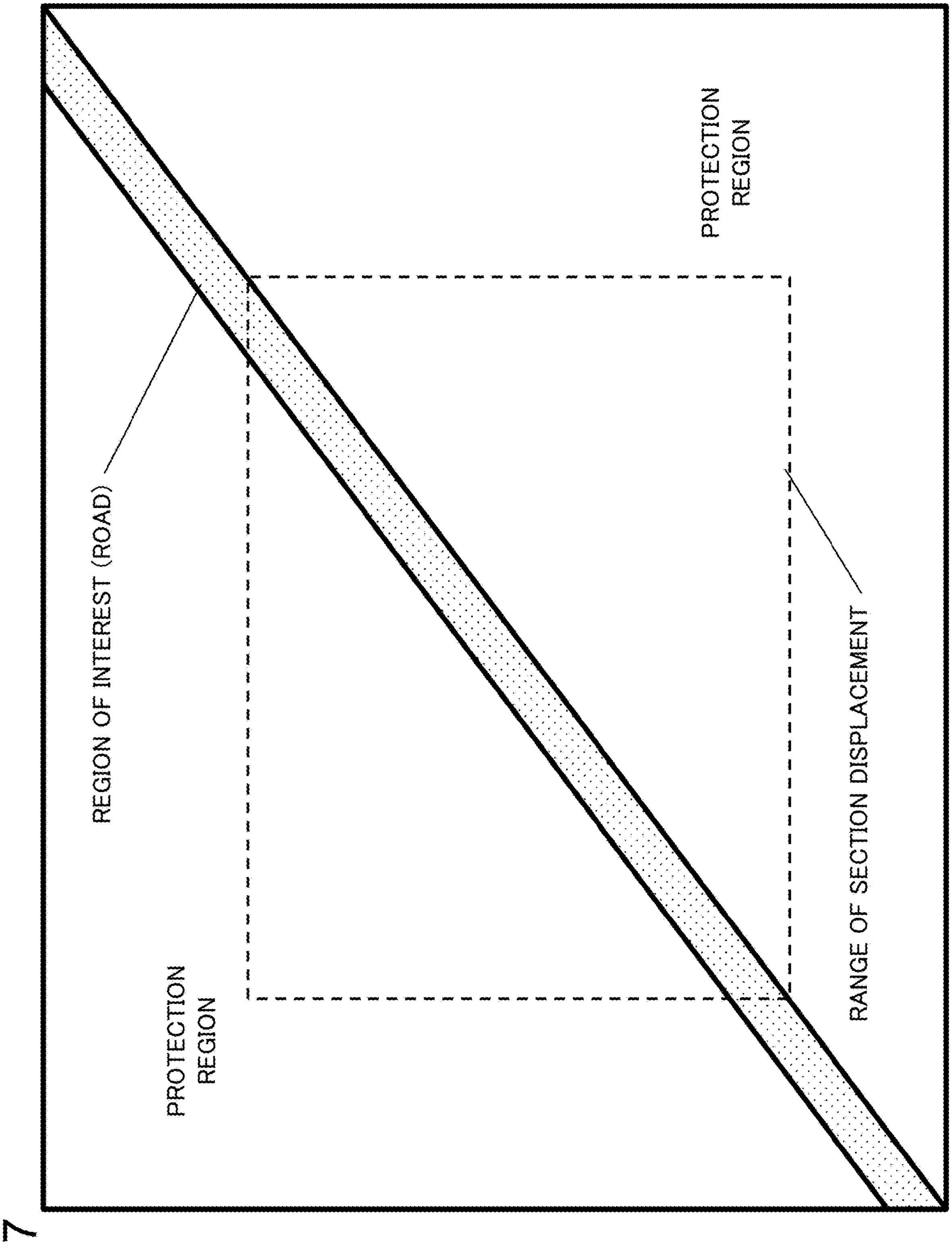
FIG. 7 is a diagram illustrating an example of a region of interest.
Figure 8:
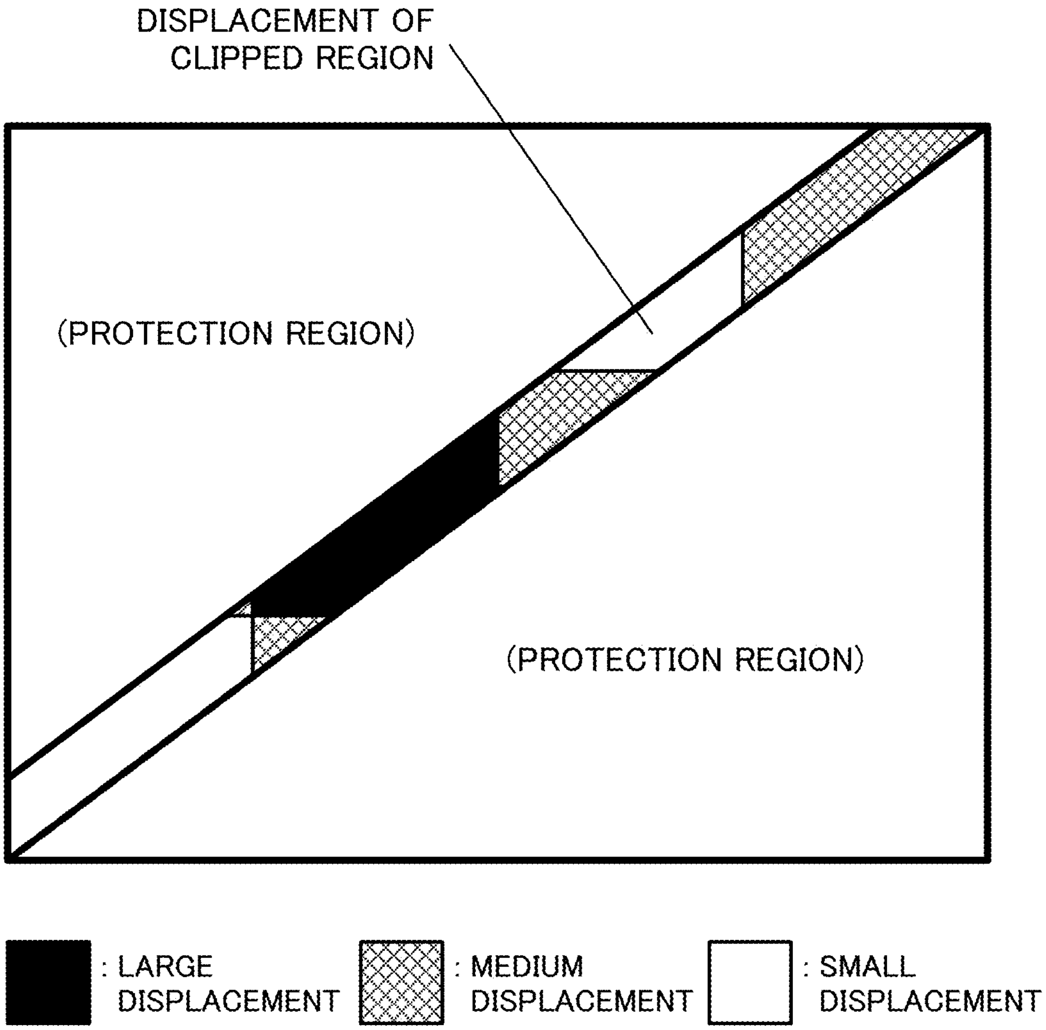
FIG. 8 is a diagram illustrating an example of clipped displacement.

FIG. 7 is a diagram illustrating an example of a region of interest. In FIG. 7, a belt-like portion from the upper right to the lower left is a region of interest (for example, a road). In FIG. 7, a region other than the region of interest is a protection region. For easy understanding of the relationship with FIGS. 6 and 8, FIG. 7 illustrates the section in FIG. 6 (the range in which section displacement is generated by the section displacement generation unit 130) using a broken line. In FIG. 7, the region of interest and the protection region extend over a range wider than the range of the section. However, this is an example. At least one of the region of interest and the protection region may be part of the section. The description returns to the description with reference to FIG. 1.

The displacement clipping unit 140 clips the ground surface displacement of the region of interest (first region) included in the section. In other words, the displacement clipping unit 140 clips the ground surface displacement of the region included in the section in the region of interest (first region). Hereinafter, the clipped ground surface displacement (this is part of the section displacement) is referred to as "clipped displacement" or "fourth ground surface displacement". A region acquired by clipping the clipped displacement is referred to as a "clipped region" or a "second region". That is, the clipped region is a region of interest included in the section. In other words, the clipped region is a region included in the section in the region of interest. In a case where information related to a section is used for clipping a region of interest, the displacement clipping unit 140 may acquire the information related to the section from the section displacement generation unit 130, or may acquire the information related to the section from the section storage unit 160.

The displacement clipping unit 140 may delete or mask the ground surface displacement of the protection region (region other than the region of interest) in the section displacement, and may set the remaining ground surface displacement as the clipped displacement.

As described above, the displacement clipping unit 140 may use either the region of interest or the protection region. The displacement clipping unit 140 may omit the process for the section not including the region of interest. For example, displacement clipping unit 140 may first extract a section including the region of interest, and clip ground surface displacement related to the region of interest included in the extracted section.

FIG. 8 is a diagram illustrating an example of clipped displacement. FIG. 8 illustrates the ground surface displacement (clipped displacement/fourth ground surface displacement) of the clipped region (second region) included in the region of interest (first region) illustrated in FIG. 7 in the section displacement (third ground surface displacement) illustrated in FIG. 6. For example, when the region of interest in FIG. 7 is a road, the clipped displacement in FIG. 8 is the ground surface displacement of the road portion in the section displacement. The description returns to the description with reference to FIG. 1.

The region setting unit 190 may output at least one of the set region of interest and the set protection region to the displacement clipping unit 140. In this case, the displacement output device 10 may not include the region storage unit 170. Alternatively, the displacement output device 10 may acquire at least one of the region of interest and the protection region from an external device (not illustrated) in advance and store the acquired region in the region storage unit 170. In this case, the displacement output device 10 may not include the region setting unit 190. Alternatively, the displacement clipping unit 140 may acquire at least one of the region of interest and the protection region from an external device (not illustrated). In this case, the displacement output device 10 may not include the region setting unit 190 and the region storage unit 170. Alternatively, the displacement clipping unit 140 may use a preset region of interest or a preset protection region. Also in this case, the displacement output device 10 may not include the region setting unit 190 and the region storage unit 170.

Figure 22:
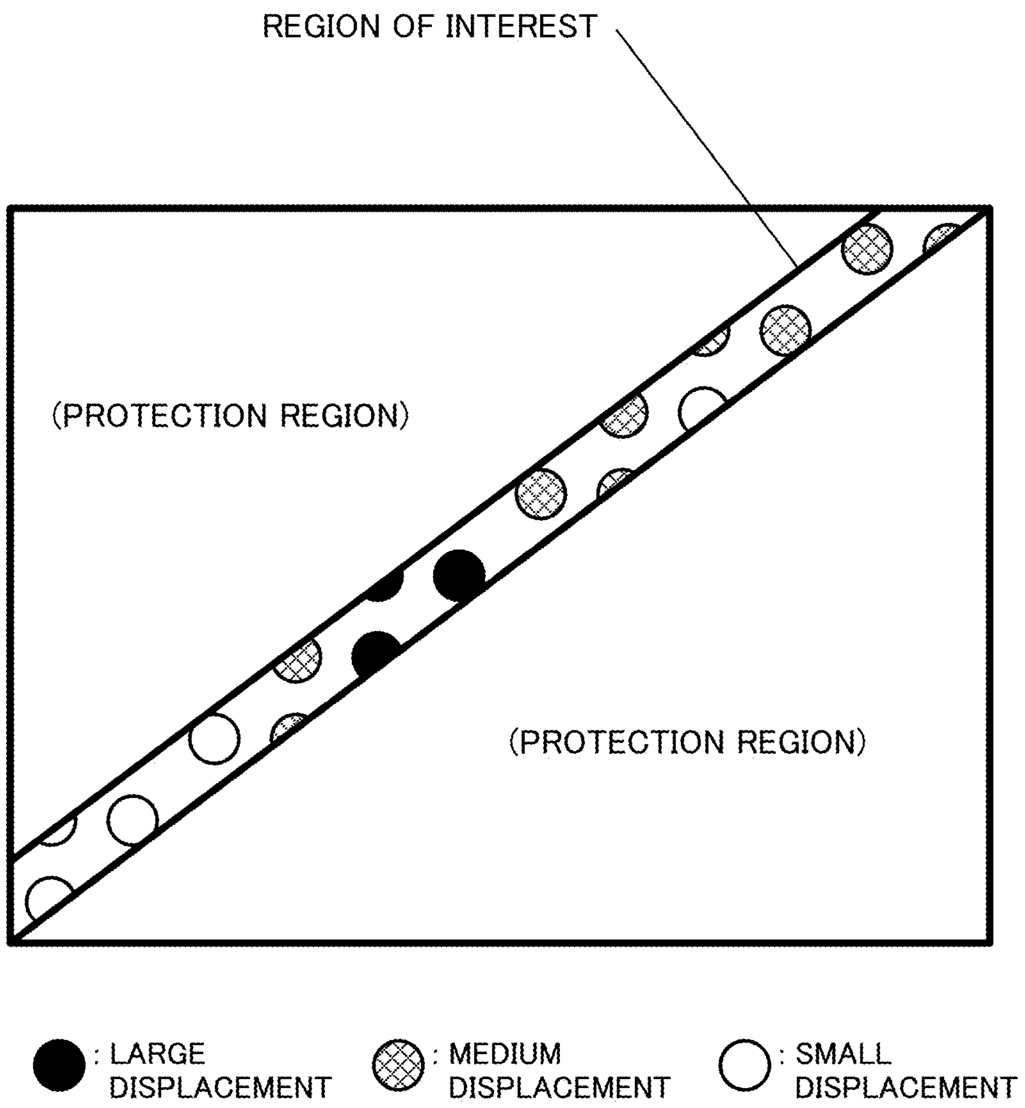
FIG. 22 is a diagram illustrating an example of clipping using acquired displacement and estimated displacement.

The displacement output device 10 may not use a section. In this case, the displacement clipping unit 140 may clip the acquired displacement (first ground surface displacement) and the estimated displacement (second ground surface displacement) included in the region of interest (first region) from the acquired displacement (first ground surface displacement) and the estimated displacement (second ground surface displacement). However, either the acquired displacement or the estimated displacement may not be included in the region of interest. In this case, the displacement clipping unit 140 may clip the acquired displacement or the estimated displacement included in the region of interest. That is, the displacement clipping unit 140 may clip at least one of the acquired displacement and the estimated displacement. Alternatively, as the clipping of the displacement, the displacement clipping unit 140 may delete (or masking) the estimated displacement and the estimated displacement included in the protection region, and output the remaining acquired displacement and the remaining estimated displacement. FIG. 22 is a diagram illustrating an example of clipping using the acquired displacement and the estimated displacement. As illustrated in FIG. 22, the displacement output device 10 may clip the acquired displacement and the estimated displacement in the region of interest. The description returns to the description with reference to FIG. 1. When no section is used, the displacement output device 10 may not include the section displacement generation unit 130, the section storage unit 160, and the section setting unit 180.

The output unit 150 outputs the clipped displacement in the clipped region to a predetermined device (for example, the display device 30). For example, in a case where the output unit 150 outputs the clipped displacement in the clipped region to the display device 30, the display device 30 displays the clipped displacement as illustrated in FIG. 8. When the displacement output device 10 does not use the section, the output unit 150 outputs at least one of the acquired displacement and the estimated displacement clipped by the displacement clipping unit 140.

Thus, the displacement output device 10 estimates the second ground surface displacement (estimated displacement) at the second point (estimation point) different from the first point, using the first ground surface displacement (acquired displacement) at the first point (acquisition point) acquired from the SAR 20. The displacement output device 10 then generates the third ground surface displacement (section displacement) of the section using the first ground surface displacement (acquired displacement) and the second ground surface displacement (estimated displacement). Based on such an operation, even in a case where a section includes a point where the ground surface displacement cannot be acquired, the displacement output device 10 generates the ground surface displacement (third ground surface displacement) of the section.

Further, the displacement output device 10 clips the fourth ground surface displacement (clipped displacement) of the second region (clipped region) included in the predetermined first region (region of interest) from the generated third ground surface displacement (section displacement). Then, the displacement output device 10 outputs the fourth ground surface displacement (clipped displacement) of the second region (clipped region) to a predetermined device (for example, the display device 30). Based on such an operation, the displacement output device 10 outputs the ground surface displacement of the designated region (region of interest). That is, the displacement output device 10 outputs the ground surface displacement while avoiding the output of the ground surface displacement of a region other than the region of interest, that is, a region (protection region) where the ground surface displacement is not output, in order to protect privacy and the like.

The displacement output device 10 may not use a section. In this case, the displacement output device 10 estimates the second ground surface displacement (estimated displacement) at the second point (estimation point) different from the first point using the first ground surface displacement (acquired displacement) at the first point (acquisition point) acquired from the SAR 20. Then, the displacement output device 10 clips at least one of the first ground surface displacement (acquired displacement) and the second ground surface displacement (estimated displacement) included in a predetermined first region (region of interest) from the first ground surface displacement (acquired displacement) and the second ground surface displacement (estimated displacement). Then, the displacement output device 10 outputs at least one of the first ground surface displacement (acquired displacement) and the second ground surface displacement (estimated displacement) included in the first region (region of interest) to a predetermined device (for example, the display device 30). Based on such an operation, the displacement output device 10 outputs the ground surface displacement of the designated region (region of interest). That is, the displacement output device 10 outputs the ground surface displacement while avoiding the output of the ground surface displacement of a region other than the region of interest, that is, a region (protection region) where the ground surface displacement is not output, in order to protect privacy and the like. Further, the displacement output device 10 outputs the displacement of the region of interest even when the region of interest includes a point where the ground surface displacement cannot be acquired.

[Description of Operation]

Figure 9:
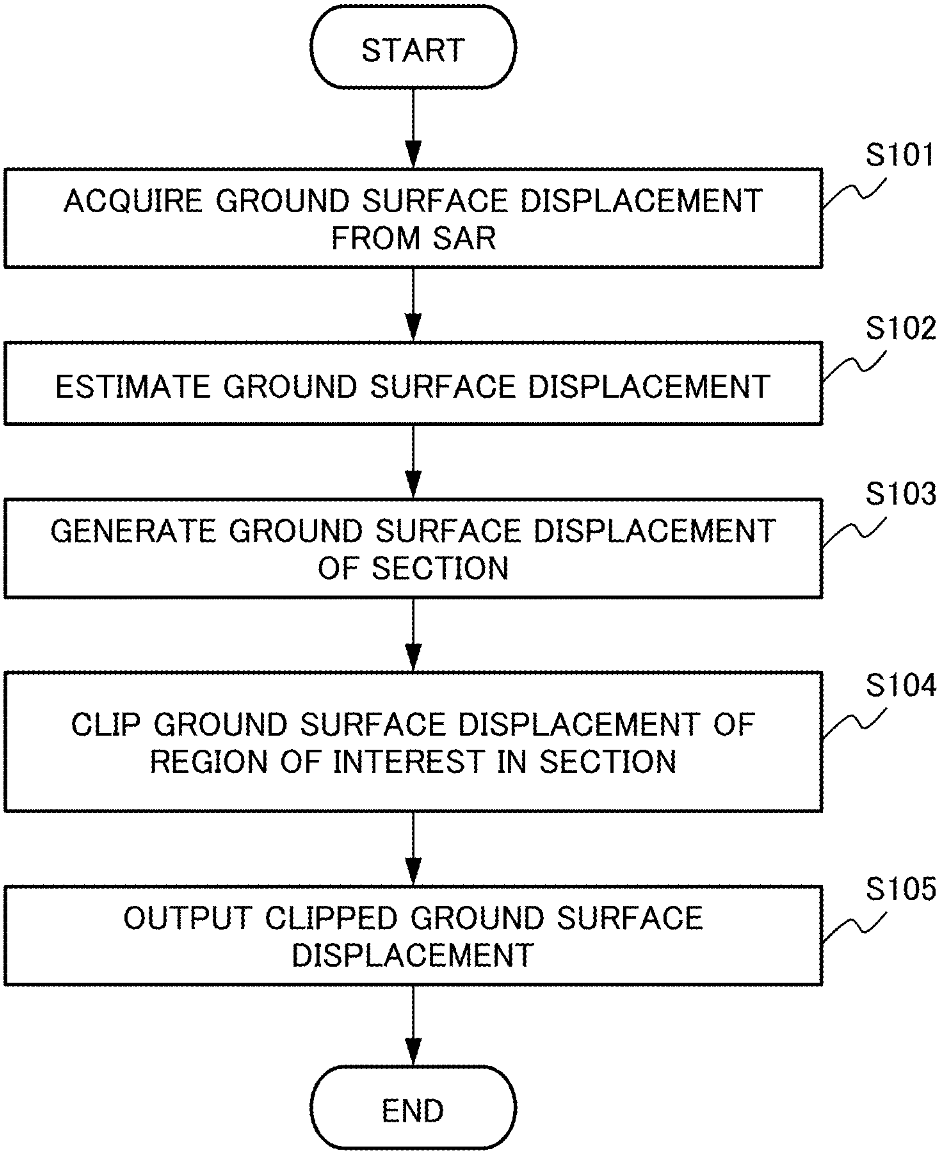
FIG. 9 is a flowchart illustrating an example of operation of a displacement output device according to the first example embodiment.

Next, an operation of the displacement output device 10 according to the first example embodiment will be described with reference to the drawings. FIG. 9 is a flowchart illustrating an example of the operation of the displacement output device 10 according to the first example embodiment.

The displacement acquisition unit 110 acquires, from the SAR 20, ground surface displacement (acquired displacement) at a point (acquisition point) where the ground surface displacement has been acquired (step S101). The displacement estimation unit 120 estimates ground surface displacement (estimated displacement) at a point (estimation point) where the acquired displacement cannot be acquired using the acquired displacement (step S102). The section displacement generation unit 130 generates ground surface displacement (section displacement) of a section including at least one of the acquisition point and the estimation point using the acquired displacement and the estimated displacement (step S103). The displacement clipping unit 140 clips the ground surface displacement (clipped displacement) of the region (clipped region) including the region of interest in the section from the ground surface displacement (section displacement) of the section (step S104). The output unit 150 outputs the clipped ground surface displacement (clipped displacement) to a predetermined device (for example, the display device 30) (step S105).

Figure 10:
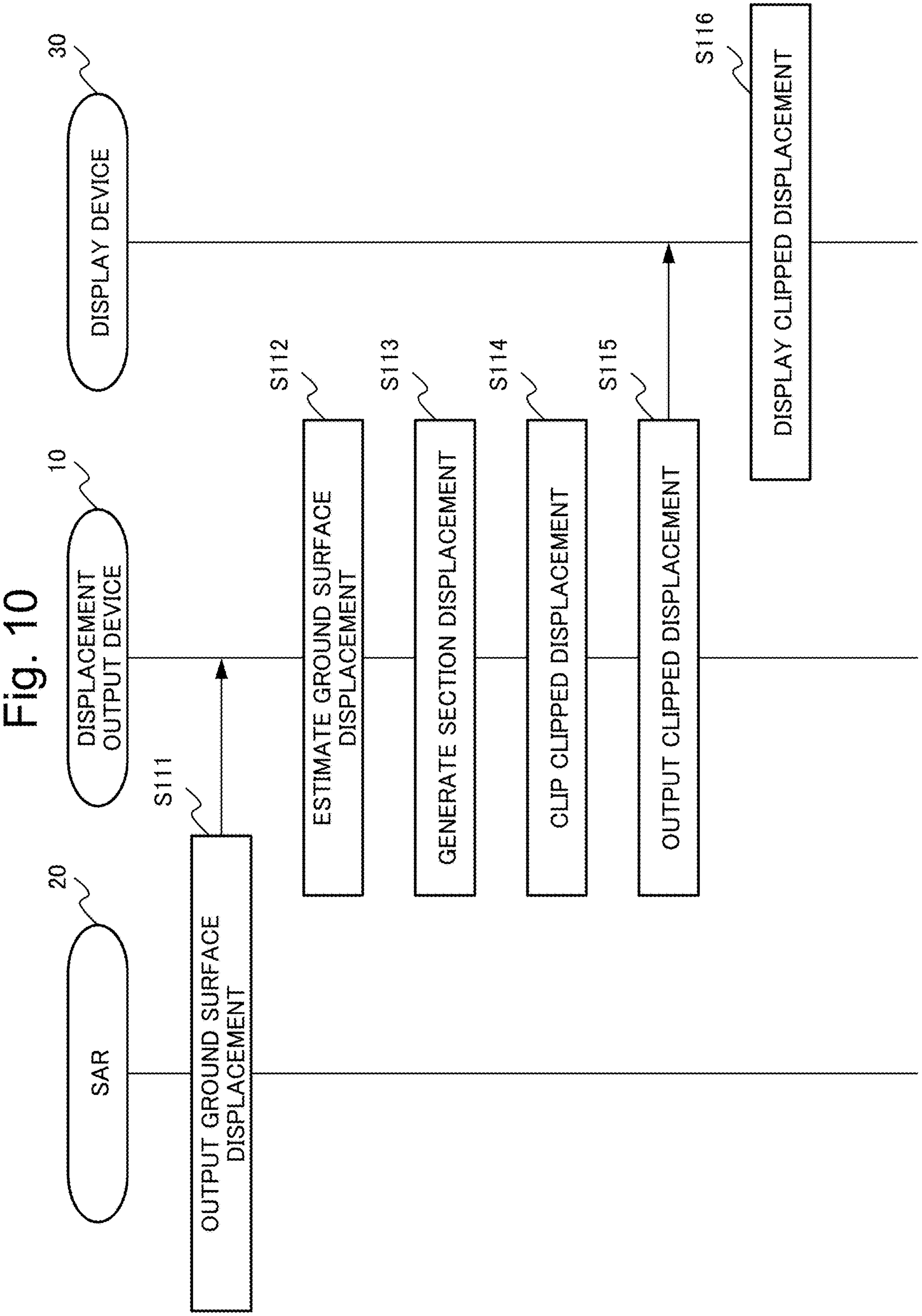
FIG. 10 is a sequence diagram illustrating an example of an operation of the displacement output system according to the first example embodiment.

FIG. 10 is a sequence diagram illustrating an example of the operation of the displacement output system 70 according to the first example embodiment. The SAR 20 outputs the ground surface displacement to the displacement output device 10 (S111). The displacement output device 10 estimates the ground surface displacement (estimated displacement) at a point where the ground surface displacement cannot be acquired using the acquired ground surface displacement (acquired displacement) (S112). The displacement output device 10 generates the ground surface displacement (section displacement) of the section using the acquired ground surface displacement (acquired displacement) and the estimated ground surface displacement (estimated displacement) (S113). The displacement output device 10 clips the ground surface displacement (clipped displacement) included in the region of interest from the ground surface displacement (section displacement) of the section (S114). The displacement output device 10 then outputs the clipped ground surface displacement (clipped displacement) to the display device 30 (S115). The display device 30 displays the acquired ground surface displacement (clipped displacement) (S116).

Figure 11:
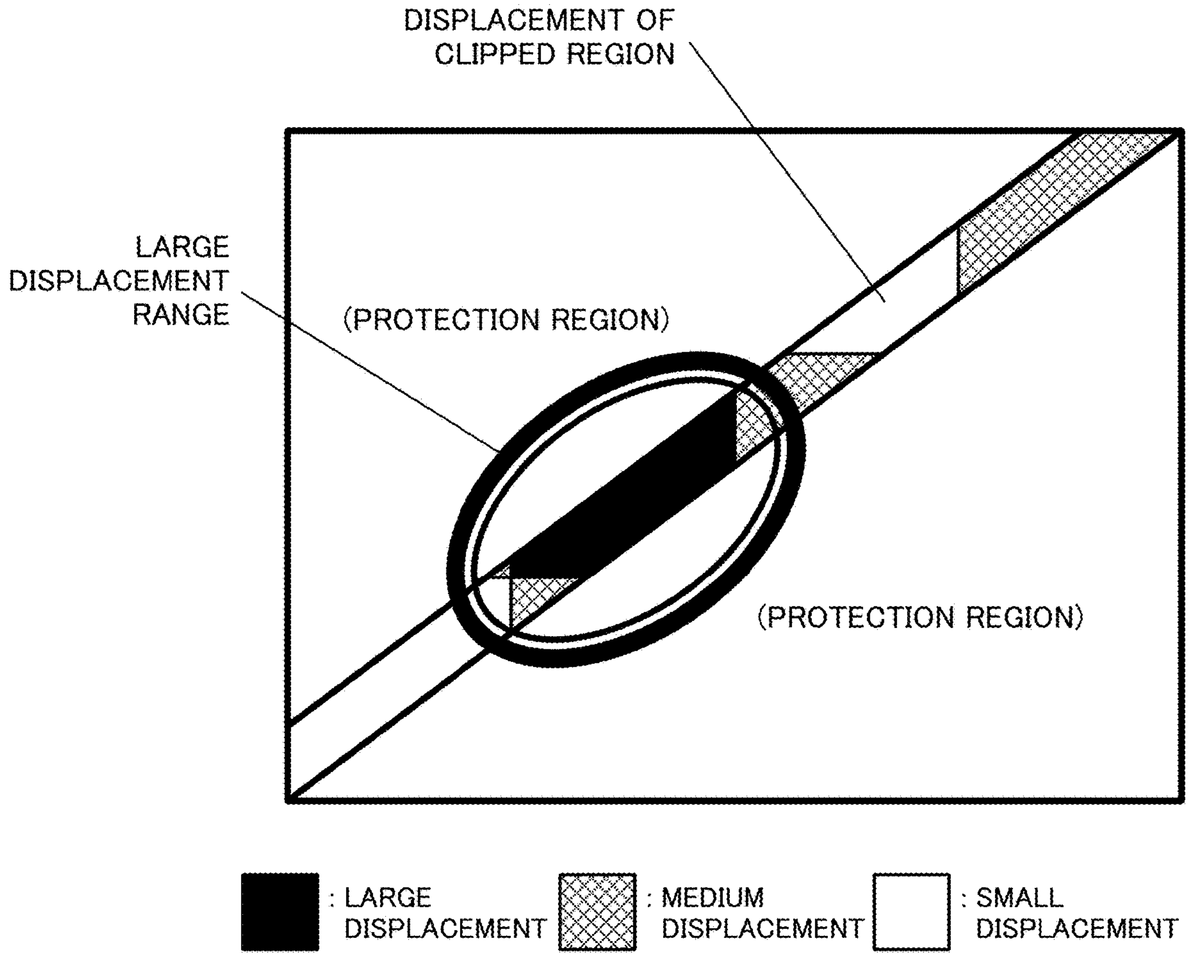
FIG. 11 is a diagram illustrating an example of highlight display.

The display device 30 may switch the display state of the ground surface displacement in accordance with an instruction from the user. For example, the display device 30 may highlight a portion (for example, a portion having a large ground surface displacement) satisfying a predetermined condition in the acquired clipped displacement. FIG. 11 is a diagram illustrating an example of highlight display. In FIG. 11, the display device 30 highlights a range where the ground surface displacement is large using a double line ellipse. When the displacement output device 10 does not use the section, the displacement output device 10 outputs at least one of the acquired displacement and the estimated displacement included in the region of interest. In this case, the display device 30 may highlight at least one of the acquired displacement and the estimated displacement satisfying the predetermined condition among at least one of the acquired displacement and the estimated displacement.

[Description of Effects]

Next, effects of the displacement output device 10 according to the first example embodiment will be described. The displacement output device 10 according to the first example embodiment can obtain the effects of outputting the ground surface displacement of the region including the point where the ground surface displacement cannot be acquired in the SAR 20 while avoiding the output of the ground surface displacement of the predetermined region. The reason is as follows.

The displacement output device 10 includes the displacement acquisition unit 110, the displacement estimation unit 120, the displacement clipping unit 140, and the output unit 150. The displacement acquisition unit 110 acquires acquired displacement (first ground surface displacement) at an acquisition point (first point) from the synthetic aperture radar (SAR) 20. The displacement estimation unit 120 estimates an estimated displacement (second ground surface displacement) at an estimation point (second point) different from the acquisition point (first point) using the acquired displacement (first ground surface displacement). The displacement clipping unit 140 clips at least one of the acquired displacement (first ground surface displacement) and the estimated displacement (second ground surface displacement) included in a preset region of interest (first region) from the acquired displacement (first ground surface displacement) and the estimated displacement (second ground surface displacement). The output unit 150 outputs at least one of the acquired displacement (first ground surface displacement) and the estimated displacement (second ground surface displacement) included in the region of interest (first region).

With the above configuration, the displacement output device 10 estimates the ground surface displacement (estimated displacement) at the point (estimation point) where the ground surface displacement cannot be acquired using the acquired ground surface displacement (acquired displacement). Then, the displacement output device 10 clips at least one of the acquired displacement and the estimated displacement included in the region of interest. Using such an operation, the displacement output device 10 according to the first example embodiment can obtain the effects of outputting the ground surface displacement of the region including the point where the SAR 20 cannot acquire the ground surface displacement while avoiding the output of the ground surface displacement of the predetermined region.

Therefore, when using the displacement output device 10, the user can acquire the ground surface displacement at a point where the ground surface displacement cannot be acquired and a range around the point. Further, the user can monitor the degradation based on the ground subsidence while avoiding output of the ground surface displacement of the predetermined region. For example, the user can monitor degradation based on ground subsidence of a road or the like while avoiding output of information about a region requiring privacy consideration such as a private land.

An example of a relation between the ground surface displacement and occurrence of degradation and damage of the structure will be described. The height of the ground surface on which structures such as buildings are based may be displaced. For example, the ground subsidence occurs due to a decrease in a groundwater level or the like. When the amount of ground subsidence increases, a load is applied to a structure constructed thereon, and degradation or damage may occur in the structure. As described above, there is a relationship between the ground surface displacement and degradation and damage of the structure. Therefore, the user can monitor degradation, damage, and the like of the structure using the ground surface displacement output by the displacement output device 10.

The displacement output device 10 further includes the section displacement generation unit 130. The section displacement generation unit 130 generates a section displacement (third ground surface displacement) of a section including at least one of the acquisition point (first point) and the estimation point (second point) using the acquired displacement (first ground surface displacement) and the estimated displacement (second ground surface displacement). Then, the displacement clipping unit 140 clips, from the section displacement (third ground surface displacement), clipped displacement (fourth ground surface displacement) of a clipped region (second region) included in the section in the region of interest (first region). Then, the output unit 150 outputs the fourth ground surface displacement (clipped displacement) of the clipped region (second region). Using such an operation, the displacement output device 10 according to the first example embodiment can output the ground surface displacement related to the predetermined spatial resolution.

The displacement output device 10 further includes the section setting unit 180. The section setting unit 180 sets a section in accordance with at least one of information about a structure to be determined, spatial resolution of the synthetic aperture radar (SAR) 20, an instruction from a user, a predetermined rule, a predetermined condition, and a region of interest (first region). With the above configuration, the displacement output device 10 can set an appropriate section according to a user's desire or the like. As a result, the displacement output device 10 can output ground surface displacement (clipped displacement) related to an appropriate section.

The section setting unit 180 may use, as the predetermined condition, a condition related to at least one of the number or the ratio of acquisition points (first points) or the number or the ratio of estimation points (second points) included in the section. Using the above operation, the displacement output device 10 can set a section appropriately related to the acquired displacement or the estimated displacement. As described above, since the section setting unit 180 sets the section using the condition related to the acquisition point or the estimation point, it is possible to improve the accuracy of generating the ground surface displacement in the section.

Furthermore, the displacement output device 10 includes the region setting unit 190. The region setting unit 190 sets the region of interest (first region) in accordance with at least one of the instruction from the user and the predetermined information. As described above, the setting of the region of interest (first region) includes the setting of the protection region (a region other than the first region). With the above configuration, the displacement output device 10 can set the region of interest related to the user's desire or the like. As a result, the displacement output device 10 can output the ground surface displacement (clipped displacement) of the region of interest related to the user's desire or the like. Alternatively, with the above configuration, the displacement output device 10 can protect the ground surface displacement of the protection region related to the user's desire or the like.

The displacement output system 70 includes the displacement output device 10, the synthetic aperture radar (SAR) 20, and the display device 30. The displacement output device 10 operates as described above. The SAR 20 outputs the acquired displacement (first ground surface displacement) to the displacement output device 10. The display device 30 displays the clipped displacement (fourth ground surface displacement) output by displacement output device 10. With such a configuration, the displacement output system 70 can output the ground surface displacement of the region including the point where the ground surface displacement cannot be acquired by the SAR 20 while avoiding the output of the ground surface displacement of the predetermined region.

Further, the display device 30 may highlight the clipped displacement (fourth ground surface displacement) satisfying the predetermined condition. In this case, the displacement output system 70 can indicate the position of the clipped displacement satisfying the predetermined condition to the user.

[Hardware Configuration]

Next, a hardware configuration of the displacement output device 10 will be described. Each configuration of the displacement output device 10 may be configured by a hardware circuit. Alternatively, in the displacement output device 10, each configuration may be configured using a plurality of devices connected via a network. For example, the displacement output device 10 may be configured using cloud computing. Alternatively, in the displacement output device 10, the plurality of configurations may be configured by one piece of hardware. Alternatively, the displacement output device 10 may be implemented as a computer device including a central processing unit (CPU), a read only memory (ROM), and a random access memory (RAM). In addition to the above configuration, the displacement output device 10 may be implemented as a computer device including a network interface circuit (NIC).

Figure 12:
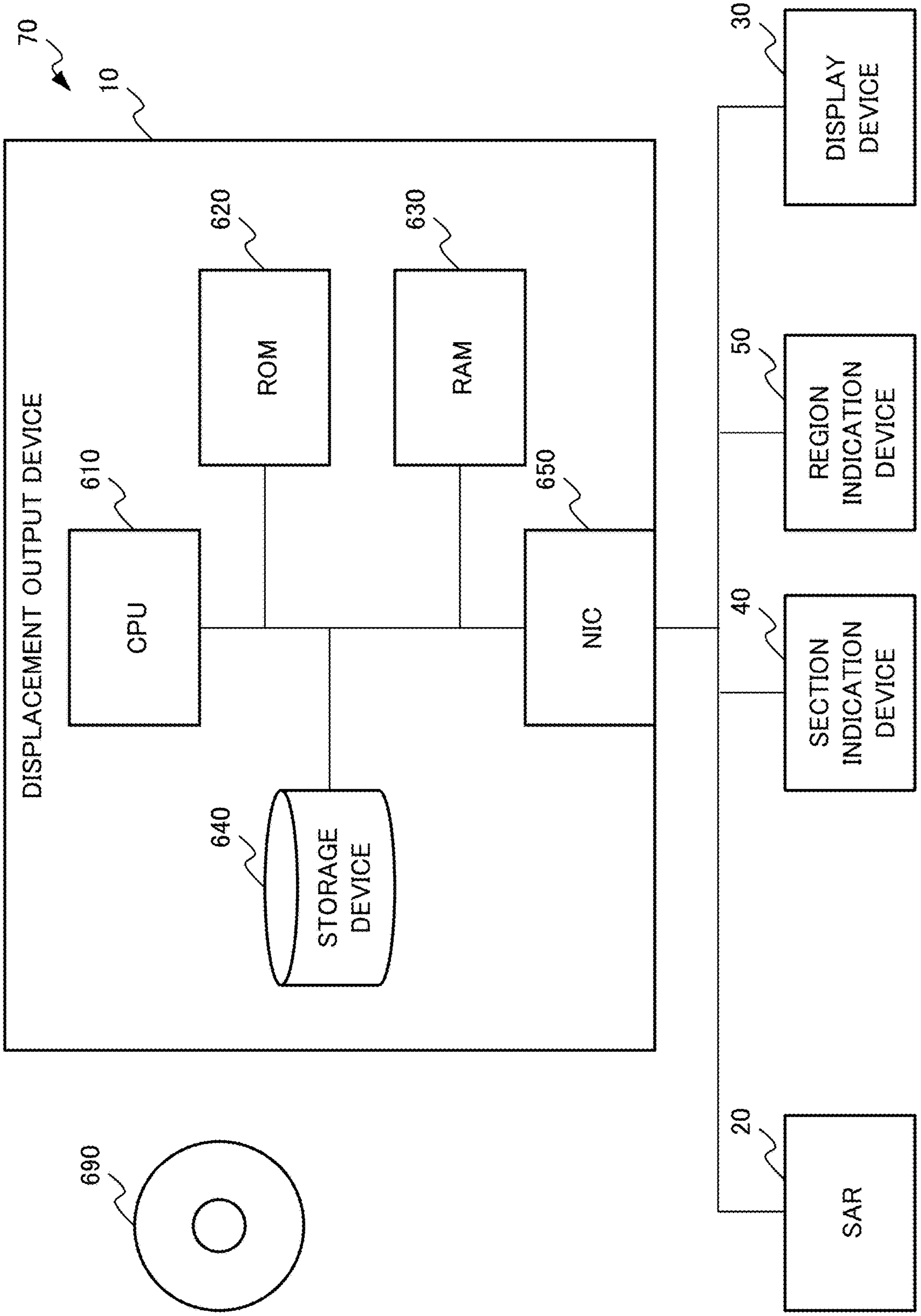
FIG. 12 is a block diagram illustrating an example of a hardware configuration of the displacement output device.

FIG. 12 is a block diagram illustrating an example of a hardware configuration of the displacement output device 10. The displacement output device 10 includes a CPU 610, a ROM 620, a RAM 630, a storage device 640, and an NIC 650, and constitutes a computer device.

The CPU 610 reads a program from the ROM 620 and/or the storage device 640. Then, the CPU 610 controls the RAM 630, the storage device 640, and the NIC 650 based on the read program. Then, the computer device including the CPU 610 controls the above configuration, and implements functions as the displacement acquisition unit 110, the displacement estimation unit 120, the section displacement generation unit 130, the displacement clipping unit 140, and the output unit 150 illustrated in FIG. 1. Furthermore, the computer device including the CPU 610 controls the above configuration, and implements the functions of the section storage unit 160, the section setting unit 180, the region storage unit 170, and the region setting unit 190.

When implementing each function, the CPU 610 may use the RAM 630 or the storage device 640 as a temporary storage medium of programs and data. The CPU 610 may read the program included in a recording medium 690 storing the program in a computer readable manner using a recording medium reading device (not illustrated). Alternatively, the CPU 610 may receive a program from an external device (not illustrated) via the NIC 650, store the program in the RAM 630 or the storage device 640, and operate based on the stored program.

The ROM 620 stores programs executed by the CPU 610 and fixed data. The ROM 620 is, for example, a programmable ROM (P-ROM) or a flash ROM. The RAM 630 temporarily stores programs and data executed by the CPU 610. The RAM 630 is, for example, a dynamic-RAM (D-RAM). The storage device 640 stores data and programs to be stored for a long time by the displacement output device 10. The storage device 640 operates as the section storage unit 160 and the region storage unit 170. The storage device 640 may operate as a temporary storage device of the CPU 610. The storage device 640 is, for example, a hard disk device, a magneto-optical disk device, a solid state drive (SSD), or a disk array device.

The ROM 620 and the storage device 640 are non-transitory recording media. On the other hand, the RAM 630 is a transitory recording medium. The CPU 610 is operable based on a program stored in the ROM 620, the storage device 640, or the RAM 630. That is, the CPU 610 can operate using a non-transitory recording medium or a transitory recording medium.

The NIC 650 relays exchange of data with an external device (the SAR 20, the display device 30, the section indication device 40, and the region indication device 50) via a network. The NIC 650 operates as at least some of the displacement acquisition unit 110, the output unit 150, the section setting unit 180, and the region setting unit 190. The NIC 650 is, for example, a local area network (LAN) card. Furthermore, the NIC 650 is not limited to use wired communication, but may use wireless communication.

The displacement output device 10 of FIG. 12 configured as described above can obtain the same effect as that of the displacement output device 10 of FIG. 1. This is because the CPU 610 of the displacement output device 10 in FIG. 12 can implement a function similar to that of the displacement output device 10 based on the program.

Second Example Embodiment

Terms

The "sensor information" is information acquired using a predetermined sensor in order to determine a state in a portion to be determined in a structure (for example, a road, a bridge, a platform, an embankment, a pier, a seawall, or a runway). In the second example embodiment, for example, information, related to a structure, acquired by a sensor information acquisition device mounted on or towed by a moving body is used as the sensor information. The moving body is, for example, a four-wheeled vehicle, a two-wheeled vehicle, a drone, or a person. The sensor information acquisition device is, for example, a drive recorder, an accelerometer, or a device including a drive recorder and an accelerometer. In this case, the information related to the structure is, for example, an image and/or acceleration. That is, the sensor information is, for example, acceleration detected by an accelerometer mounted on a vehicle traveling on a road, which is an example of a structure to be determined, an image acquired by a drive recorder, or both the acceleration and the image. The sensor information may include three or more pieces of information. The sensor information may be information acquired by a sensor information acquisition device that does not move, such as an image of a fixed camera. That is, the sensor information acquisition device may be a non-moving device.

The state of the structure to be determined is any state. For example, the state of the structure may be degradation of the structure. For example, the state of the structure may be degradation of a road surface of the road (cracks (vertical, horizontal, or tortoise-shell), a rut, a pot hole, and the like), degradation of a seal of the road surface, or fraying of a peripheral portion of the seal. Alternatively, the state of the structure may be a degradation of an article associated with the structure. For example, the state of the road may be blur of a road surface sign on the road or damage of the sign.

Alternatively, the state of the structure may be a state different from degradation. For example, a white line and a road surface sign attached to a road surface are constructed in such a way as to be visible by reflection at night. Therefore, the state of the structure may be a state of predetermined performance of the structure, such as a state of reflection of a white line of a road and a road surface sign. Alternatively, the state of the structure may be an operation state of the structure. For example, the state of the structure may be a lighting state of a street lamp, luminance of illumination, or illuminance of a road surface. Alternatively, the state of the structure may be a state related to manufacturing or refurbishing of the structure. For example, the state of the structure may be determination of the progress or quality of construction work of the structure or repair work of the structure (for example, determination of repair state of road surface).

The spatial resolution of the ground surface displacement using the SAR 20 is about several meters to several tens of meters. On the other hand, in a case where the state of the structure is determined using the sensor information such as the image of the drive recorder, the spatial resolution is about several cm to several m. As described above, the spatial resolution of the structure state determination using the sensor information is higher than the spatial resolution of the ground surface displacement acquired from the SAR 20. Therefore, the determination of the state of the structure using the sensor information can determine the state of the structure in more detail than the determination using the ground surface displacement.

When degradation of a structure is used as a state of the structure, a "degradation degree" that is a degree of degradation may be used as the degradation. The expression form of the degradation degree is any expression. For example, a numerical value may be used as the degradation degree. Alternatively, an expression other than a numerical value may be used as the degradation degree. For example, characters such as {large, small} or {large, medium, small} may be used as the degradation degree. When a value is used as the degradation degree, the range of the value of the degradation degree is any range.

For example, when the "crack rate" of the road surface is used as the degradation degree, the value of the degradation degree is in the range of 0.0 to 1.0 (0% to 100%). The crack rate is a value acquired by dividing the area of a crack by the area of the section to be investigated. Alternatively, when the "rut amount" is used as the degradation degree, the value of the degradation degree is generally an integer of equal to or more than 0 (the unit is mm.). A rational number may be used as the value of the rut amount. The rut amount is a height from the rutting portion to the protrusion in a predetermined range (for example, 20 m).

Alternatively, when "International Roughness Index (IRI)" is used as the degradation degree, the value of the degradation degree is a rational number (the unit is mm/m or m/km.) of equal to or more than 0. IRI is an evaluation index for unevenness of a paved road proposed by the World Bank in 1986. Even when "Boeing Bump Index (BBI)" is used as the degradation degree, the value of the degradation degree is a rational number (the unit is dimensionless) of equal to or more than 0. BBI is a flatness index used by the United Nations Aviation Administration in 2009. As described above, the value of the degradation degree has any range. The user may appropriately select the degradation degree related to the degradation of the structure to be determined.

The degradation used as the state of the structure is not limited to degradation (degradation degree) at a certain time point, and may be a change rate of degradation (degradation speed) in a predetermined period. For example, the state of the structure may be a degradation speed calculated by applying predetermined statistical processing to the history of the degradation degree. The degradation speed to be calculated may be calculated as a temporally constant value or may be calculated as a temporally changing value. For example, linear approximation such as linear regression may be used as the degradation speed. Alternatively, a quadratic curve (quadratic regression) may be used as the degradation speed. The user may appropriately select the type of degradation speed according to the determination target.

Furthermore, in the second example embodiment, the degradation degrees related to a plurality of degradations may be used as the degradation degree. For example, in the second example embodiment, when the degradation is a crack and a rut generated on a road, the degradation degree is, for example, a crack rate and a rut amount. In this case, in the second example embodiment, each degradation speed may be used in addition to the degradation degree for each degradation.

The "surface layer" of the structure is a portion where the state can be confirmed from the outside of the structure with reference to the sensor information. For example, the surface layer of the structure is a portion including a surface and a range from the surface to a predetermined depth. Alternatively, the surface layer of the structure is in contact with another object in the structure (for example, in the case of a paved road, a surface layer in contact with a tire of a vehicle). In the following description, a portion excluding the surface layer of the structure is referred to as a "deep layer".

In the following description, a road, a drive recorder (and a fixed camera), an image, and degradation (for example, a crack) are used as examples of the structure, the sensor information acquisition device, the sensor information, and the state of the structure, respectively. However, these do not limit the second example embodiment.

[Description of Configuration]

Figure 13:
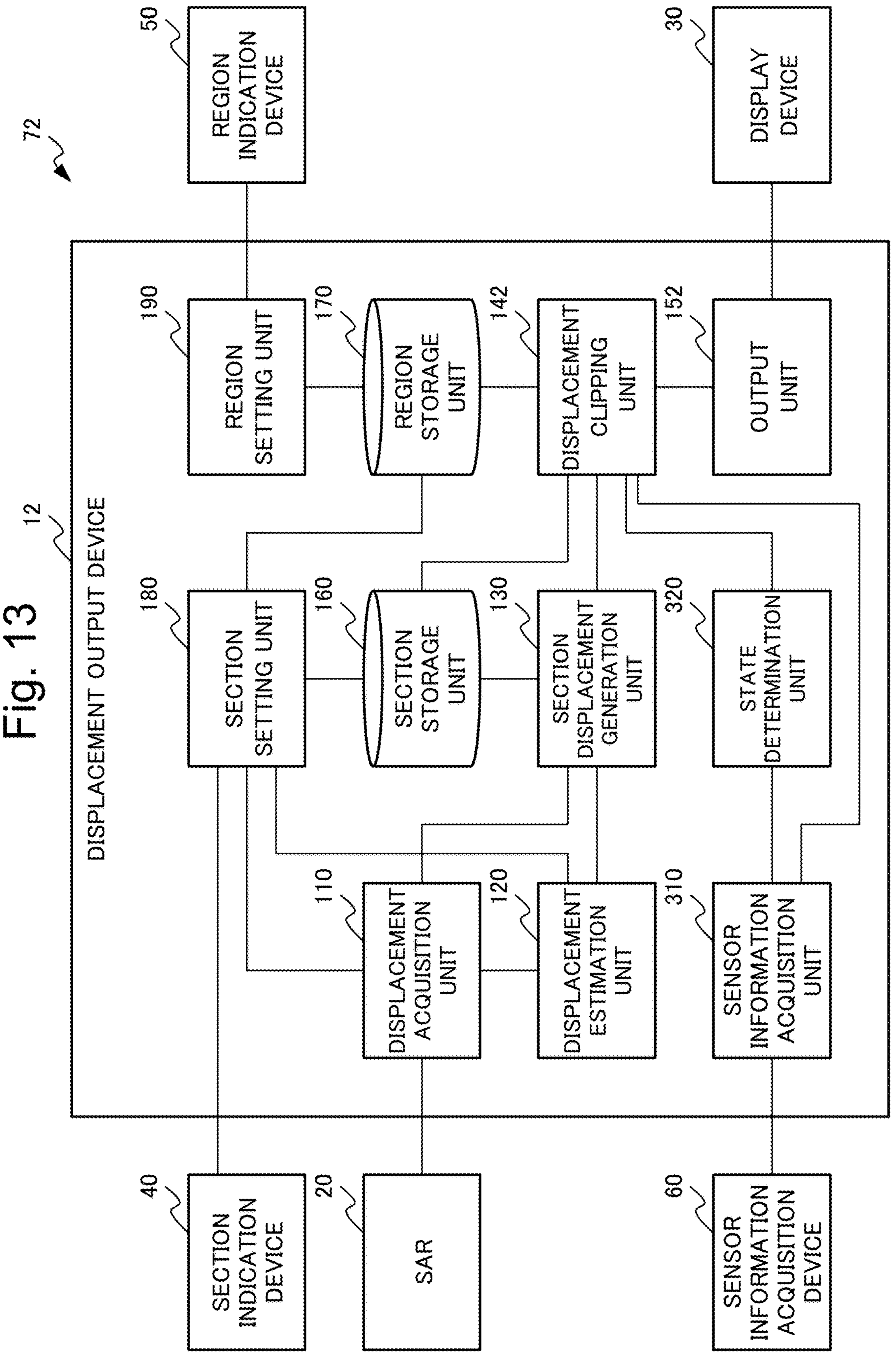
FIG. 13 is a block diagram illustrating an example of a configuration of a displacement output system according to the second example embodiment.

Next, a configuration of a displacement output system 72 according to the second example embodiment will be described with reference to the drawings. FIG. 13 is a block diagram illustrating an example of a configuration of the displacement output system 72 according to the second example embodiment. The displacement output system 72 includes a displacement output device 12, the SAR 20, the display device 30, the section indication device 40, the region indication device 50, and a sensor information acquisition device 60. The displacement output system 72 may include a plurality of at least any devices. For example, the displacement output system 72 may include a plurality of sensor information acquisition devices 60.

The devices included in the displacement output system 72 are connected via a predetermined communication path (for example, the Internet or a public telephone line). The communication path may be wired, wireless, or a combination of wired and wireless.

Since the SAR 20, the section indication device 40, and the region indication device 50 are similar to those of the first example embodiment, detailed description thereof is omitted.

The sensor information acquisition device 60 acquires sensor information (for example, an image) related to a structure to output the acquired sensor information to the displacement output device 12. For example, the sensor information acquisition device 60 is a drive recorder mounted on a vehicle. However, the sensor information acquisition device 60 may be a fixed device such as a fixed camera. In a case where the sensor information is an image, the sensor information acquisition device 60 may use, as the image, any of a still image, a moving image, and a combination of a still image and a moving image. Furthermore, the sensor information acquisition device 60 may include another information (for example, at least one of the acquisition time, the acquisition position, the voice, and the surrounding environment) in the sensor information.

The displacement output device 12 includes a displacement clipping unit 142 and an output unit 152 instead of the displacement clipping unit 140 and the output unit 150 in the configuration of the displacement output device 10. The displacement output device 12 further includes a sensor information acquisition unit 310 and a state determination unit 320. Since the other configurations are similar to those of the first example embodiment, detailed description thereof will be omitted, and a configuration specific to the second example embodiment will be mainly described. The displacement output device 12 may be implemented using a computer device illustrated in FIG. 12. Alternatively, each configuration of the displacement output device 12 may directly exchange information, or may exchange information via an information storage unit (not illustrated).

The sensor information acquisition unit 310 acquires sensor information from the sensor information acquisition device 60.

The state determination unit 320 determines the state of the structure (hereinafter, referred to as a "first state") using the sensor information. For example, in a case where the sensor information acquisition device 60 is a drive recorder mounted on a vehicle traveling on a road, the sensor information acquisition unit 310 acquires an image of the road from the drive recorder. Then, the state determination unit 320 determines the state of the road (for example, surface layer degradation of road) using the acquired image of the road.

As in the displacement clipping unit 140 of the first example embodiment, the displacement clipping unit 142 clips the clipped displacement (fourth ground surface displacement) of a clipped region (second region). Further, the displacement clipping unit 142 clips a state of the structure (hereinafter, referred to as a "second state") related to the clipped region (second region) from the state of the structure (first state) determined by the state determination unit 320. The displacement clipping unit 142 may clip the states of all of the structures related to the clipped region, or may clip the state of some of the structure related to the clipped region. Further, in addition to the state of the structure related to the clipped region, the displacement clipping unit 142 may clip the state of the structure of a range not related to the clipped region. For example, as the state of the structure partially included in the clipped region, the displacement clipping unit 142 may clip not only the state of the portion included in the clipped region in the structure but also the state of the portion not included in the clipped region in the structure. When the displacement output device 12 does not use the section, the displacement clipping unit 142 clips the acquired displacement and the estimated displacement included in the region of interest.

In the second example embodiment, the clipped displacement (fourth ground surface displacement) of the clipped region (second region) is associated with the state (second state) of the structure determined using the sensor information. The clipped region (second region) is a region clipped from the region of interest (first region). Therefore, in the second example embodiment, the region of interest (in particular, the clipped region) includes, at least in part, a region where sensor information for determining the state of the structure can be acquired. However, the region of interest is any region as long as it includes a region where the sensor information can be acquired. For example, the region of interest may be a region including a structure (for example, a road or bridge) on which a moving body (for example, a vehicle) on which the sensor information acquisition device 60 is mounted travels.

In a case where the sensor information acquisition device 60 is a fixed camera installed in a building, a steel tower, or the like, the sensor information acquisition device 60 can acquire an image other than the ground surface such as a side face (wall) and an upper face (rooftop) of the building in addition to an image of the ground surface such as a road. As described above, the sensor information acquisition device 60 may be able to acquire not only information about the structure (for example, a road) on the ground surface, but also sensor information about a predetermined position (for example, a rooftop or wall of a building) of the structure. Therefore, the region of interest may be a region including a structure having a certain height.

Alternatively, the sensor information acquisition device 60 may be a camera installed in an observation station (water level observation station, rainfall observation station, water quality observation station, and the like). In this case, the sensor information acquisition device 60 can acquire sensor information related to a structure through which a vehicle or the like cannot pass, such as an image of a bank of a river, for example. Therefore, the region of interest may include a region through which a vehicle or the like cannot pass. Even in a case where the sensor information acquisition device 60 is a device mounted on a moving body (for example, a vehicle), the sensor information may include information about a structure of a region through which the moving body cannot pass in addition to information about a structure through which the moving body passes. For example, the drive recorder can acquire an image of a structure around a road. Therefore, for example, the region of interest is not limited to the region of the road through which the vehicle passes, but may be a region including structures around the road, such as a building around the road, a slope frame installed on a slope next to the road, or a bank of a river.

The displacement clipping unit 142 may output other information in addition to the clipped displacement (fourth ground surface displacement) and the state of the clipped structure (second state). For example, the displacement clipping unit 142 may output sensor information (for example, an image) used for determining the state of the structure. In this case, the displacement clipping unit 142 may clip the sensor information related to the region of interest in the output sensor information. For example, when the sensor information is an image including a road and surrounding buildings and the region of interest is a road, the displacement clipping unit 142 may clip a portion of the road in the image. Alternatively, the displacement clipping unit 142 may protect the sensor information in a region (that is, the protection region) other than the region of interest in the sensor information to be output. For example, when the sensor information is an image including a road and surrounding buildings and the region of interest is a road, the displacement clipping unit 142 may protect (for example, masking) the image of the surrounding buildings in the image.

The output unit 152 outputs the state (second state) of the clipped structure to a predetermined device (for example, the display device 30) in association with the clipped displacement (fourth ground surface displacement). The order and timing at which the output unit 152 outputs the clipped displacement (fourth ground surface displacement) and the state of the clipped structure (second state) are any order and timing. For example, the output unit 152 may first output the clipped displacement (fourth ground surface displacement) or may first output the state of the structure (second state). The output unit 152 may collectively output the clipped displacement (fourth ground surface displacement) and the state of the clipped structure (second state), or may separately output the clipped displacement (fourth ground surface displacement) and the state of the clipped structure (second state). Furthermore, in a case where the displacement clipping unit 142 outputs information other than the clipped displacement (fourth ground surface displacement) and the state of the clipped structure (second state), the output unit 152 may output the information to a predetermined device (for example, the display device 30).

When the displacement output device 12 does not use the section, the displacement clipping unit 142 to output unit 152 operate as follows. The displacement clipping unit 142 clips, from the first ground surface displacement (acquired displacement) and the second ground surface displacement (estimated displacement), at least one of the first ground surface displacement (acquired displacement) and the second ground surface displacement (estimated displacement) included in a predetermined first region (region of interest). Further, the displacement clipping unit 142 clips a state (second state) of the structure related to at least one of the first ground surface displacement (acquired displacement) and second ground surface displacement (estimated displacement) clipped from the state (first state) of the structure determined by the state determination unit 320. Then, the output unit 152 outputs at least one of the first ground surface displacement (acquired displacement) and the second ground surface displacement (estimated displacement) included in the first region (region of interest) and the second state (state of the clipped structure) to a predetermined device (for example, the display device 30).

As in the first example embodiment, the display device 30 displays the clipped region acquired from the displacement output device 12 or at least one of the acquired displacement and the estimated displacement. Hereinafter, for convenience of description, the clipped displacement and at least one of the acquired displacement and the estimated displacement will be collectively described using a "clipped region". That is, "display of clipped region (fourth region)" in the following description may be changed to "display of at least one of the acquired displacement (first ground surface displacement) and the estimated displacement (second ground surface displacement)". Further, the display device 30 displays the state (second state) of the structure acquired from the displacement output device 12. Display of the clipped displacement and the state of the structure on display device 30 are any display. The user may appropriately determine a display method on the display device 30. For example, the display device 30 may display the state (second state) of the structure using at least one of a figure and a symbol (for example, icons or arrows). Furthermore, the display device 30 may change a figure or a symbol used for display according to the state (second state) of the structure. For example, the display device 30 may use an icon related to the type (for example, the type of degradation) of the state of the structure.

The display device 30 may display the state (second state) of the related structure at an any position with respect to the clipped displacement (fourth ground surface displacement). For example, the display device 30 may display the state (second state) of the structure in the vicinity of the display of the clipped displacement (fourth ground surface displacement) or superimposed on at least part of the clipped displacement.

The spatial resolution (that is, the size of the section) of the clipped displacement is different from the spatial resolution of the state of the structure. The display device 30 may display the clipped displacement and the state of the structure related to each spatial resolution. Generally, the state of the structure has higher spatial resolution than the ground surface displacement (in particular, section displacement). Therefore, the second example embodiment can output more detailed information related to the state of the structure than the first example embodiment. However, for ease of display and the like, the display device 30 may display the spatial resolution in display of the clipped displacement (fourth ground surface displacement) and the state of the related structure (second state) together. For example, the display device 30 may collectively display the states of the structures related to the respective sections in accordance with the sections in the clipped region.

Figure 14:
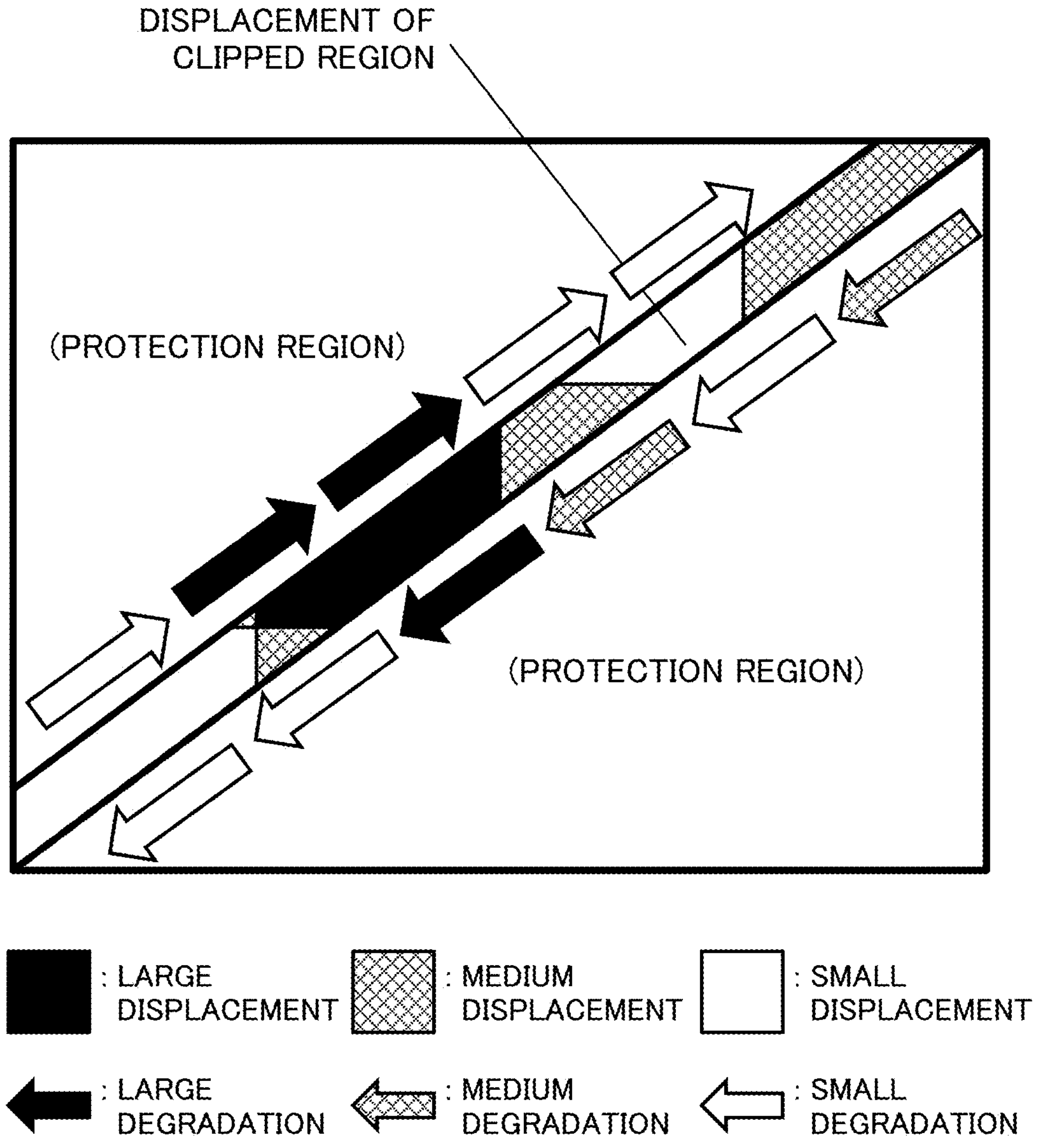
FIG. 14 is a diagram illustrating an example of display of clipped displacement and a state of a structure.

FIG. 14 is a diagram illustrating an example of display of clipped displacement and a state of a structure. In FIG. 14, the display device 30 indicates the magnitude of degradation, which is an example of the state of the structure, in the vicinity of the clipped displacement using an arrow. In FIG. 14, the direction of the arrow indicates the traveling direction of the vehicle on the road. With reference to FIG. 14, the user can confirm the relevance between the ground surface displacement and the degradation of the structure.

The displacement output device 12 may set a level related to a combination of the clipped displacement (fourth ground surface displacement) and the state of the structure (second state) of the clipped region, and output the level in addition to the clipped displacement and the state of the structure. In this case, the display device 30 may display the level in association with the clipped displacement or the like, and may change the display of the clipped displacement or the like according to the level.

The display device 30 may determine the level using the acquired clipped displacement (fourth ground surface displacement) and the state of the structure of the clipped region (second state). An example of the level will be described using surface layer degradation of the structure as the state of the structure. The displacement output device 12 determines "large/small" of each of the ground surface displacement and the surface layer degradation using the threshold for each of the ground surface displacement and the surface layer degradation. The displacement output device 12 then determines four types of degradation levels for a portion to be determined in the structure to be determined, using the "large/small" determination result of each of the ground surface displacement and the surface layer degradation. "Small" for the ground surface displacement and the surface layer degradation includes a case where there is no ground surface displacement and no surface layer degradation, respectively.

The displacement output device 12 determines a level of a portion where both the ground surface displacement and the surface layer degradation are small as "level 1". The portion determined to be level 1 is a portion with a sound state or with a degradation with an extent that the degradation does not hinder operation. The displacement output device 12 determines a level of a portion where the ground surface displacement is large and the surface layer degradation is small as "level 2". The portion determined to be level 2 is a portion where surface layer degradation of the structure is small, but the ground surface (that is, the ground surface that is the foundation of the structure) is greatly displaced. Therefore, the portion determined to be level 2 is a portion where surface layer degradation is small, but degradation may occur to a deep layer (for example, a deep layer close to the soil of a road). Alternatively, the portion determined to be level 2 is a portion where degradation has not occurred yet but is assumed to be more likely to occur in the future than the portion determined to be level 1.

The displacement output device 12 determines a level of a portion where the ground surface displacement is small and the surface layer degradation is large as level 3. The portion determined to be level 3 is a portion where the degradation of the structure is assumed to occur to a surface layer and/or a portion close to the surface layer because the displacement of the ground serving as the basis of the structure is small. The displacement output device 12 determines a level of a portion where the ground surface displacement is large and the surface layer degradation is large as level 4. The portion determined to be level 4 is a portion where the displacement of the ground serving as the base of the structure is large and the surface layer degradation of the structure is large. Therefore, the portion determined to be level 4 is a portion assumed to be highly likely to be degraded not only to the surface layer but also to the deep layer.

The magnitude of the risks of levels 1 to 4 is roughly as follows.

$$\text{level } 1 < \text{level } 2 \approx \text{level } 3 < \text{level } 4$$

However, which one of level 2 and level 3 has a larger risk differs depending on the structure to be determined, a data collection situation, and the like. Therefore, for example, the user may determine which one of level 2 and level 3 has a higher risk using the structure to be determined and the data collection situation. The user may refer to the level displayed on the display device 30 in planning for repair or the like of a structure. For example, the user may start repair from the portion of level 4.

Figure 15:
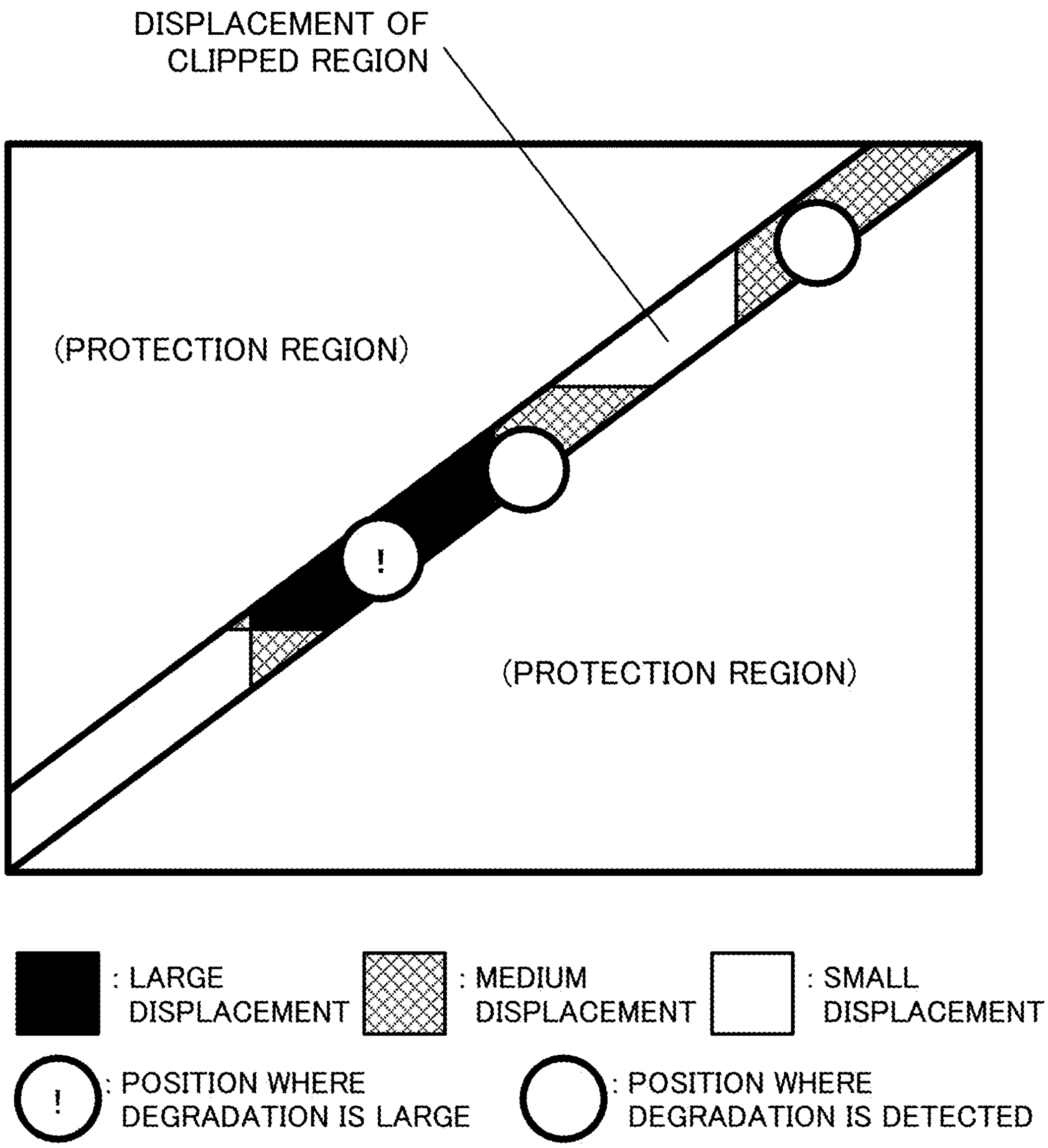
FIG. 15 is a diagram illustrating another example of display of clipped displacement and a state of a structure.

The display of the state of the structure is not limited to the arrow. The display device 30 may display the state of the structure using another figure or symbol (for example, the icon). FIG. 15 is a diagram illustrating another example of the display of the clipped displacement and the state of the structure. In FIG. 15, the display device 30 uses an icon (white circle in FIG. 15) to indicate degradation and a degree of degradation that is an example of a state.

The display device 30 may change the display of the state (second state) of the structure of the clipped region in accordance with the instruction from the user. For example, a case where the display device 30 includes a touch panel will be described. The display device 30 displays a tool (for example, a radio button, a check box, or a menu) for changing the display on the touch panel. Then, when detecting an operation on the displayed tool, the display device 30 changes the display of the state of the structure in accordance with the operation.

For example, the display device 30 may zoom up and zoom back the state of the structure being displayed. In this case, the display device 30 may separately change the spatial resolution of the ground surface displacement and the spatial resolution of the state of the structure. For example, in a case where the spatial resolution of the state of the structure is displayed in accordance with the spatial resolution of the ground surface displacement, the display device 30 may display the spatial resolution of the state of the structure in detail in zooming up.

Alternatively, the display device 30 may change the range (for example, the type of degradation) of the state of the structure to be displayed. For example, the display device 30 may narrow or widen a range (for example, the range of the degradation type) of the state of the structure to be displayed. Alternatively, the display device 30 may narrow or widen the degree of the state of the structure to be displayed (for example, the magnitude of degradation).

The display device 30 may display information (for example, the sensor information used for determining the state of the structure) related to the state of the structure in accordance with an instruction from the user.

For example, in a case where the displacement output device 12 outputs sensor information used for determining the state of the structure in addition to the clipped displacement and the state of the related structure, the display device 30 may display the sensor information in accordance with an instruction from the user. For example, the display device 30 may display the sensor information when detecting an operation on an icon indicating the state of the structure.

Figure 16:
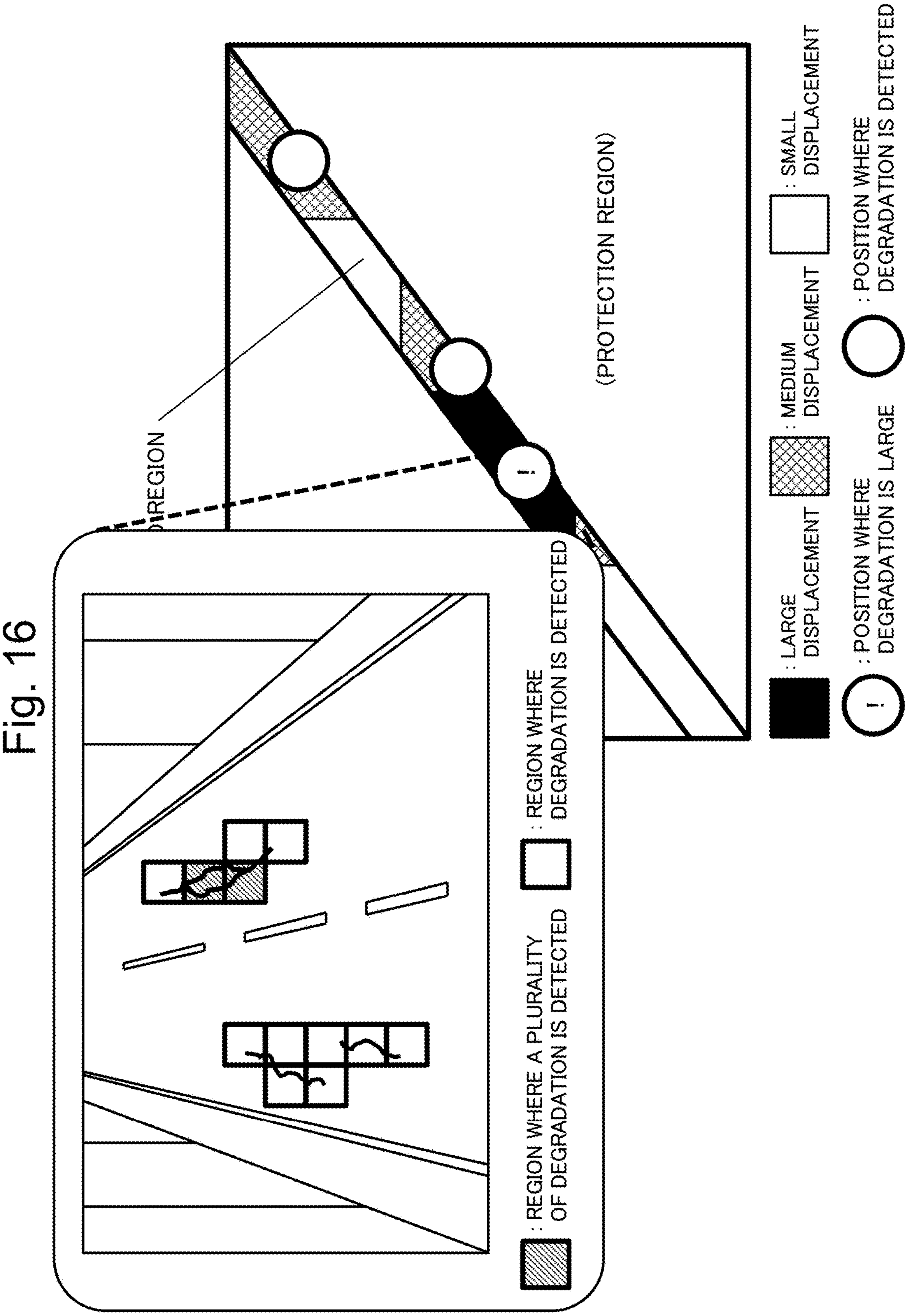
FIG. 16 is a diagram illustrating an example of display of sensor information.

FIG. 16 is a diagram illustrating an example of display of sensor information. In FIG. 16, the display device 30 displays an image of a road at a position denoted by "!", and the degradation determined in the image. The display device 30 may use a display method such as three-dimensional computer graphics or a perspective drawing method in displaying the sensor information (for example, an image). Furthermore, in a case where the sensor information is a moving image, the display device 30 may display a moving image.

Figure 17:
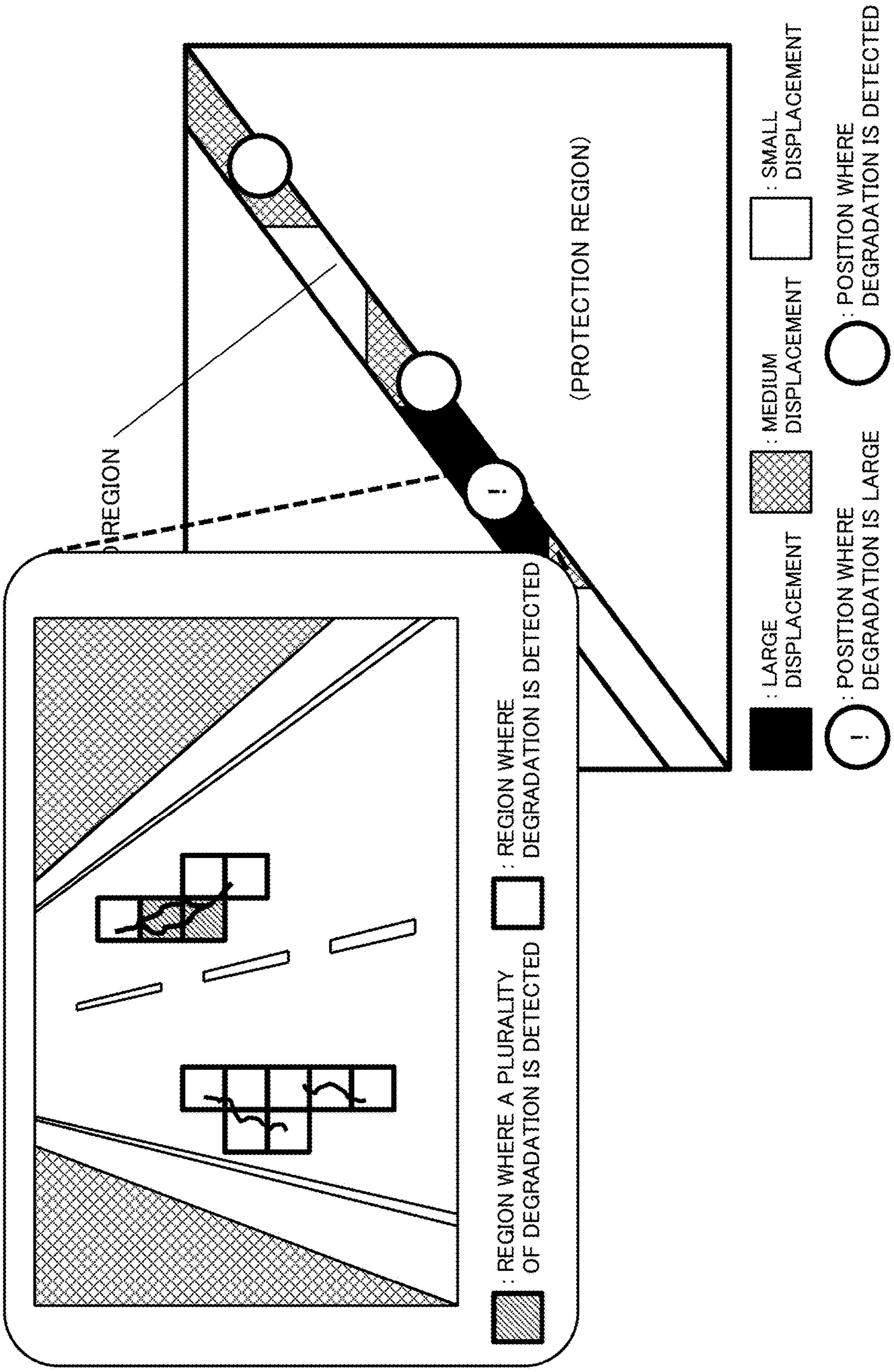
FIG. 17 is a diagram illustrating an example of display of protected sensor information.

When the displacement output device 12 outputs the sensor information in which the protection region is protected, the display device 30 may display the protected sensor information. In this case, the display device 30 may use display for indicating that the protection region is protected as the display of the protection region. FIG. 17 is a diagram illustrating an example of display of protected sensor information. In FIG. 17, the display device 30 hatches the protection region (a portion other than the road) in the image acquired as the sensor information.

Figure 18:
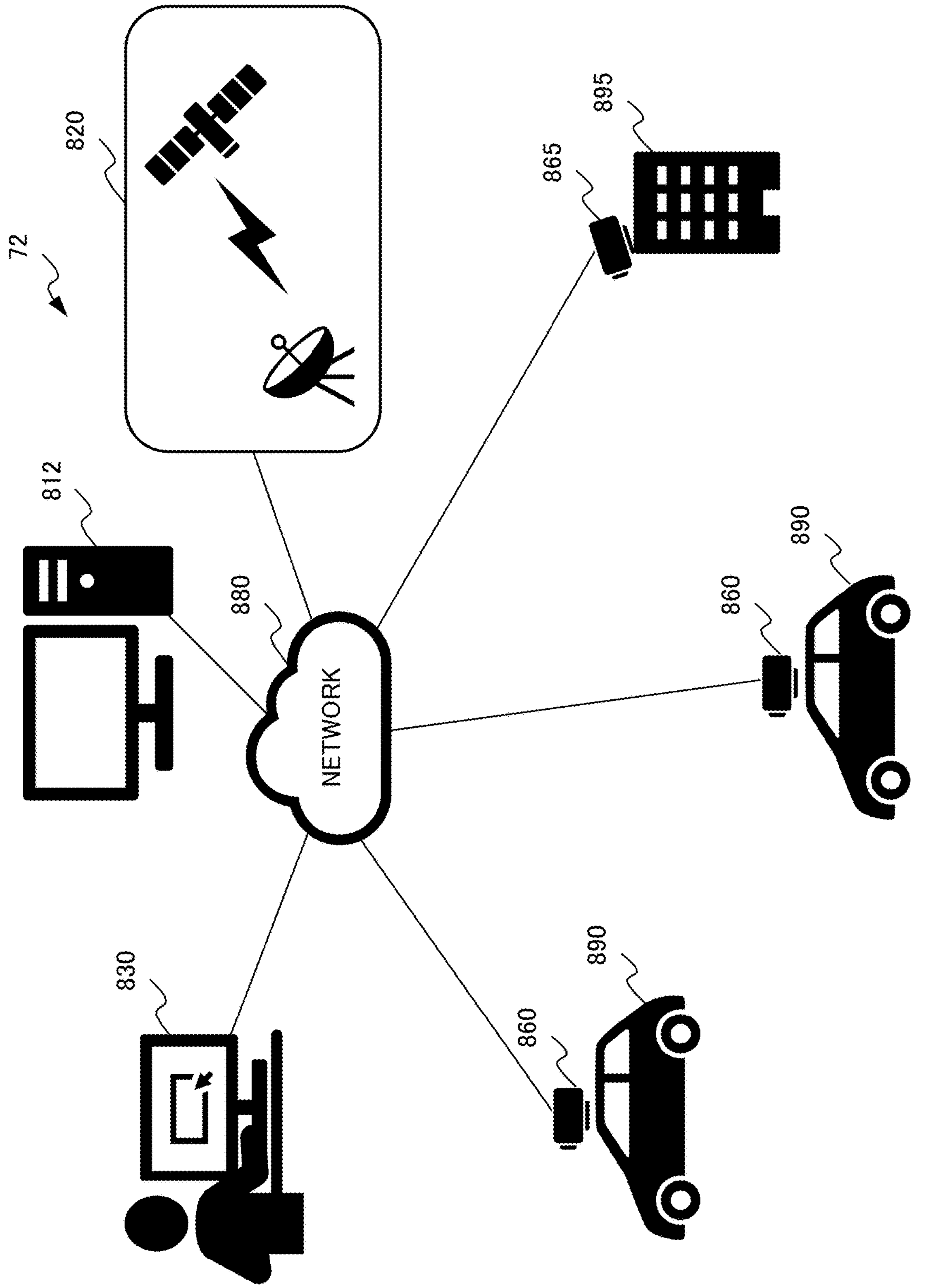
FIG. 18 is a diagram illustrating an example of a specific configuration of a displacement output system according to the second example embodiment.

FIG. 18 is a diagram illustrating an example of a specific configuration of the displacement output system 72 according to the second example embodiment. The displacement output system 72 of FIG. 18 includes a computer 812 as an example of the displacement output device 12, and the SAR system 820 that includes an artificial satellite and a ground station as an example of the SAR 20. Further, the displacement output system 72 includes the terminal device 830 as the display device 30. The terminal device 830 may operate as the section indication device 40 and the region indication device 50. Further, the displacement output system 72 includes a drive recorder 860 mounted on a vehicle 890 as an example of the sensor information acquisition device 60. Further, the displacement output system 72 includes a fixed camera 865 installed in a building 895 as an example of the sensor information acquisition device 60. FIG. 18 illustrates an example in a case where a plurality of sensor information acquisition devices (the drive recorder 860 and the fixed camera 865) is included. Furthermore, FIG. 18 illustrates the network 880 as a communication path for connecting each device and the system. The network 880 is a communication path that connects each device and the system to each other. The network 880 is not particularly limited as long as each device and the system can be connected. For example, the network 880 may be the Internet, a public telephone line, or a combination thereof.

The SAR system 820 determines a ground surface displacement based on the SAR image acquired using the artificial satellite to output the determined ground surface displacement to the computer 812. The drive recorder 860 outputs an image of a road on which the vehicle 890 travels to the computer 812 as the sensor information. The fixed camera 865 outputs an image of a road near the building 895 to the computer 812 as sensor information. The computer 812 estimates the missing a ground surface displacement using the acquired ground surface displacement. Then, the computer 812 generates the ground surface displacement of a predetermined section using the acquired ground surface displacement and the estimated ground surface displacement. Then, the computer 812 clips a ground surface displacement of a predetermined region from the ground surface displacement of the section. Furthermore, the computer 812 determines the state of the road (for example, degradation) using the images acquired from the drive recorder 860 and the fixed camera 865. Then, the computer 812 outputs the generated clipped displacement and the state of the related road to the terminal device 830. The computer 812 may acquire information related to at least one of the section and the region from the terminal device 830 in generating the ground surface displacement of the section and clipping the ground surface displacement. The terminal device 830 displays the ground surface displacement and the state of the road acquired from the computer 812.

The computer 812, the SAR system 820, the terminal device 830, the drive recorder 860, and the fixed camera 865 included in the displacement output system 72 are not particularly limited. As the computer 812, the SAR system 820, the terminal device 830, the drive recorder 860, and the fixed camera 865, generally available products and systems may be used. Therefore, a detailed description thereof will be omitted.

[Description of Operation]

Figure 19:
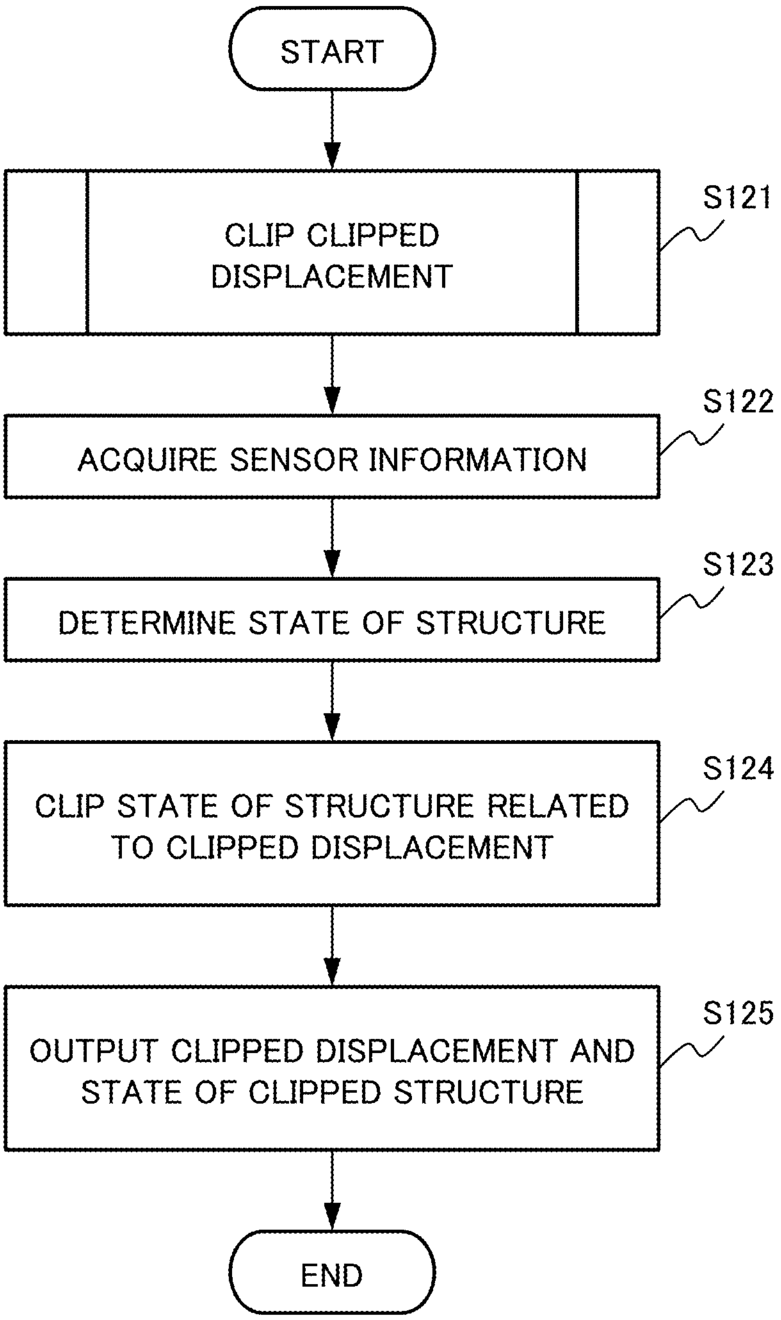
FIG. 19 is a flowchart illustrating an example of operation of a displacement output device according to the second example embodiment.

Next, the operation of the displacement output device 12 according to the second example embodiment will be described with reference to the drawings. FIG. 19 is a flowchart illustrating an example of the operation of the displacement output device 12 according to the second example embodiment.

As in the displacement output device 10, the displacement output device 12 clips a clipped displacement (fourth ground surface displacement) using the ground surface displacement (acquired displacement/first ground surface displacement) acquired from the SAR 20 (step S121). This operation is the same as that of steps S101 to S104 in FIG. 9. The sensor information acquisition unit 310 acquires sensor information (step S122). The state determination unit 320 determines the state (first state) of the structure using the sensor information (step S123). The displacement clipping unit 142 clips a state (second state) of the structure related to the clipped displacement (fourth ground surface displacement) from the determined state (first state) of the structure (step S124). The output unit 152 outputs the clipped displacement (fourth ground surface displacement) and the state (second state) of the structure clipped related to the clipped displacement (step S125).

[Description of Effects]

Next, effects of the displacement output device 12 according to the second example embodiment will be described. The displacement output device 12 according to the second example embodiment can obtain the effects of outputting the state of the structure related to the ground surface displacement in addition to the effects of the first example embodiment. The reason is as follows.

The displacement output device 12 includes the displacement clipping unit 142 and the output unit 152 instead of the displacement clipping unit 140 and the output unit 150 in the configuration of the displacement output device 10, and further includes the sensor information acquisition unit 310 and the state determination unit 320. The sensor information acquisition unit 310 acquires sensor information related to a structure from the sensor information acquisition device 60. The state determination unit 320 determines the state (first state) of the structure using the sensor information. The displacement clipping unit 142 clips the state (second state) of the structure related to the clipped region (second region) from the state (first state) of the structure. Then, the output unit 152 outputs the state (second state) of the clipped structure in association with the clipped displacement (fourth ground surface displacement). With the above configuration, the displacement output device 12 can output the state of the structure in addition to the ground surface displacement. In general, the spatial resolution of the structure state is higher than the spatial resolution of the ground surface displacement (in particular, section displacement). Therefore, the second example embodiment can output more detailed information related to the state of the structure than the first example embodiment.

The displacement output system 72 includes the displacement output device 12, the synthetic aperture radar (SAR) 20, the display device 30, and the sensor information acquisition device 60. The displacement output device 12 operates as described above. The SAR 20 outputs the acquired displacement (first ground surface displacement) to the displacement output device 12. The sensor information acquisition device 60 outputs the sensor information to the displacement output device 12. The display device 30 displays the clipped displacement (fourth ground surface displacement) output by displacement output device 12 and the state of the clipped structure (second state) in association with each other. With such a configuration, the displacement output system 72 provides the user with the ground surface displacement (clipped displacement) of the region of interest and the state of the structure (state of the clipped structure) in association with each other.

The display device 30 may display the state (second state) of the clipped structure using at least one of the figure and the symbol. The display device 30 may display the state (second state) of the clipped structure in the vicinity of or in superposition with at least part of display of the clipped displacement (fourth ground surface displacement) (alternatively, at least one of the acquired displacement (first ground surface displacement) and the estimated displacement (second ground surface displacement)). The display device 30 may change the display according to a combination (for example, a level) of the clipped displacement (fourth ground surface displacement) (alternatively, at least one of the acquired displacement (first ground surface displacement) and the estimated displacement (second ground surface displacement)) and the state of the clipped structure (second state).

The display device 30 may change the display of the state (second state) of the clipped structure in accordance with the instruction from the user. The displacement output device 12 may output information (for example, sensor information) related to the state of the clipped structure (second state). The display device 30 may display information (for example, sensor information) related to the state (second state) of the clipped structure in accordance with the instruction from the user. The display device 30 may display information (for example, sensor information) related to the state (second state) of the clipped structure using three-dimensional computer graphics or a perspective drawing method. Using the operation as described above, the displacement output system 72 provides effective information to the user.

Third Example Embodiment

[Description of Configuration]

Figure 20:
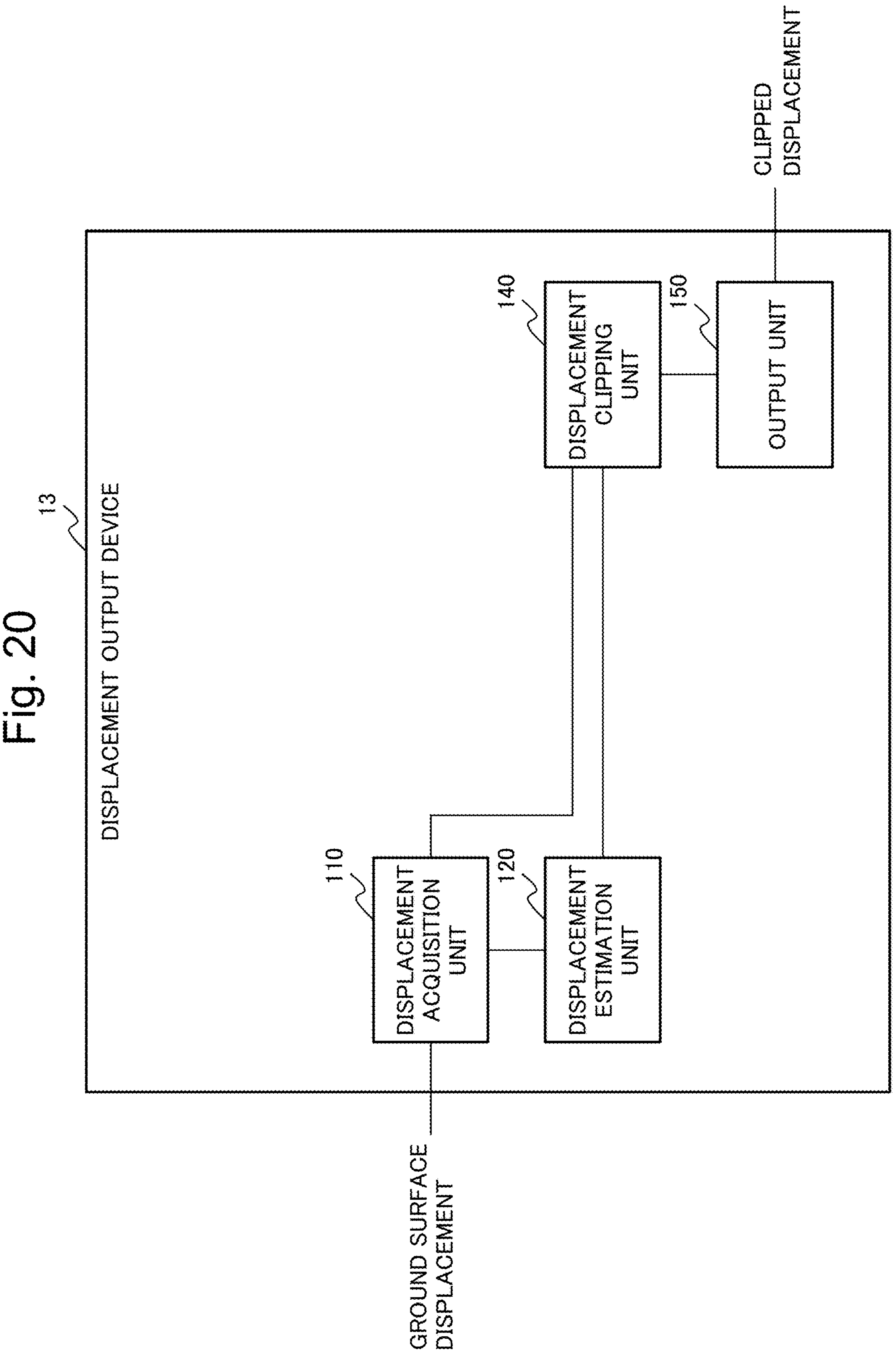
FIG. 20 is a block diagram illustrating an example of a configuration of a displacement output device according to the third example embodiment.

A configuration of a displacement output device 13 according to the third example embodiment will be described with reference to the drawings. FIG. 20 is a block diagram illustrating an example of a configuration of the displacement output device 13 according to a third example embodiment.

The displacement output device 13 includes the displacement acquisition unit 110, the displacement estimation unit 120, the displacement clipping unit 140, and the output unit 150. The displacement acquisition unit 110 acquires acquired displacement (first ground surface displacement) at an acquisition point (first point) from the synthetic aperture radar (SAR) 20. The displacement estimation unit 120 estimates an estimated displacement (second ground surface displacement) at an estimation point (second point) different from the acquisition point (first point) using the acquired displacement (first ground surface displacement). The displacement clipping unit 140 clips at least one of the acquired displacement (first ground surface displacement) and the estimated displacement (second ground surface displacement) included in a preset region of interest (first region) from the acquired displacement (first ground surface displacement) and the estimated displacement (second ground surface displacement). The output unit 150 outputs at least one of the acquired displacement (first ground surface displacement) and the estimated displacement (second ground surface displacement) included in the region of interest (first region).

The displacement output device 13 may be implemented using a computer device illustrated in FIG. 12. The displacement output device 13 configured as described above can obtain the same effect as the displacement output device 10. The displacement output device 13 has the minimum configuration of the displacement output device 10 of the first example embodiment.

[System]

Figure 21:
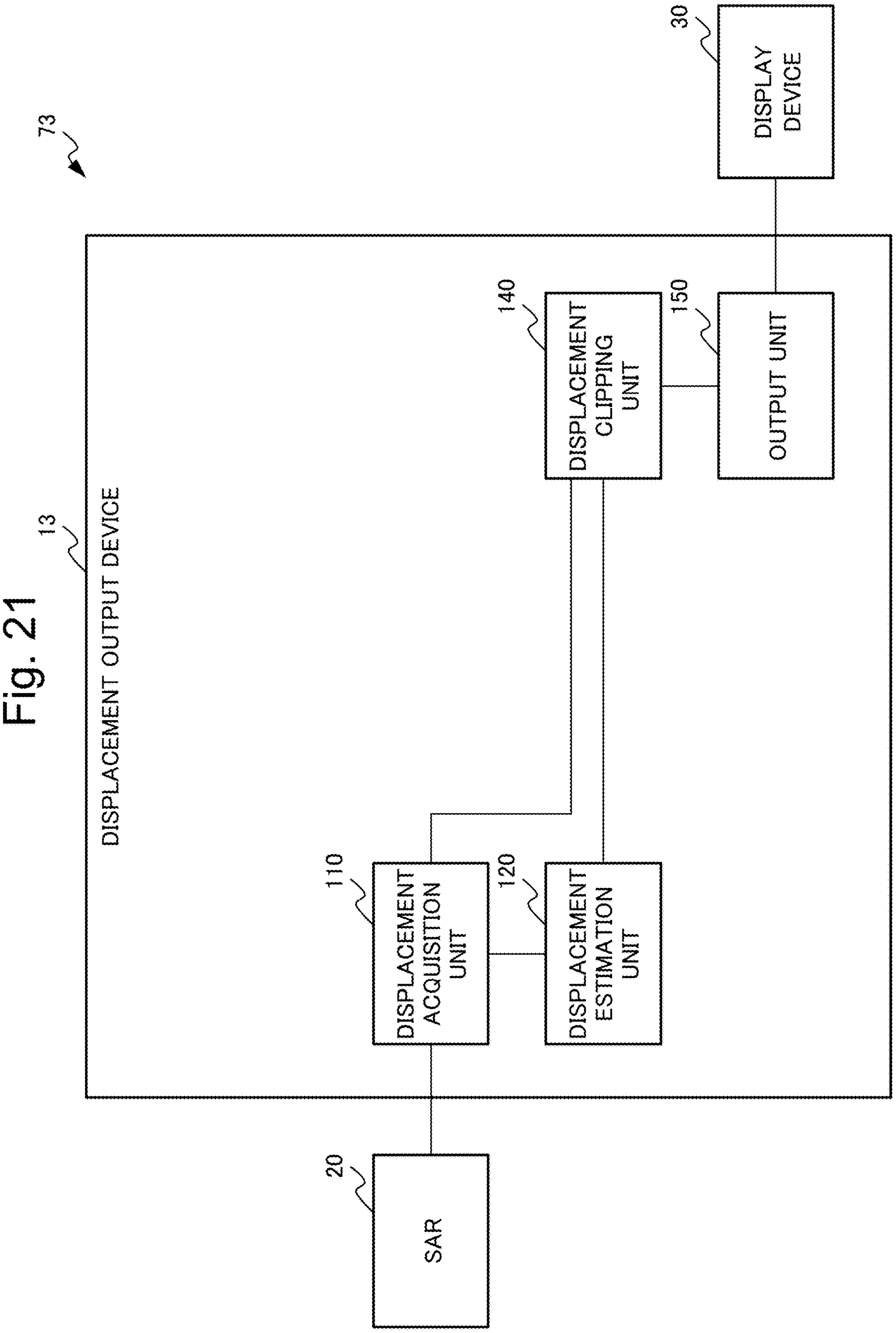
FIG. 21 is a block diagram illustrating an example of a configuration of a displacement output system including the displacement output device of the third example embodiment.

FIG. 21 is a block diagram illustrating an example of a configuration of a displacement output system 73 including the displacement output device 13 of the third example embodiment. The displacement output system 73 includes the displacement output device 13, the synthetic aperture radar (SAR) 20, and the display device 30. The displacement output device 13 operates as described above. The SAR 20 outputs the acquired displacement (first ground surface displacement) to the displacement output device 13. The display device 30 displays the clipped displacement (fourth ground surface displacement) output by displacement output device 13. The displacement output system 73 configured as described above can achieve the same effect as the displacement output system 70. The displacement output system 73 is the minimum configuration of the displacement output system 70 of the first example embodiment.

Some or all of the above example embodiments may be described as the following Supplementary Notes, but are not limited to the following.

(Supplementary Note 1)

A displacement output device including:

A displacement acquisition means configured to acquire a first ground surface displacement at a first point from a synthetic aperture radar;

a displacement estimation means configure to estimate a second ground surface displacement at a second point different from the first point using the acquired first ground surface displacement;

a displacement clipping means configured to clip at least one of the first ground surface displacement and the second ground surface displacement included in a preset first region from the first ground surface displacement and the second ground surface displacement; and an output means configured to output at least one of the first ground surface displacement and the second ground surface displacement included in the first region.

(Supplementary Note 2)

The displacement output device according to Supplementary Note 1, further including:

a section displacement generation means configured to generate a third ground surface displacement of a section including at least one of the first point and the second point using the first ground surface displacement and the second ground surface displacement, wherein the displacement clipping means clips, from the third ground surface displacement, a fourth ground surface displacement of a second region included in the section in the first region, and the output means outputs the fourth ground surface displacement of the second region.

(Supplementary Note 3)

The displacement output device according to Supplementary Note 2, further including:

a section setting means configured to set the section in accordance with at least one of information about a structure to be determined, spatial resolution of the synthetic aperture radar, an instruction from a user, a predetermined rule, a predetermined condition, and the first region.

(Supplementary Note 4)

The displacement output device according to Supplementary Note 3, wherein the section setting means uses, as a predetermined condition, a condition related to at least one of the number or a ratio of the first points or the number or a ratio of the second points included in the section.

(Supplementary Note 5)

The displacement output device according to any one of Supplementary Notes 1 to 4, further including:

a region setting means configured to set the first region in accordance with at least one of an instruction from a user and predetermined information.

(Supplementary Note 6)

The displacement output device according to any one of Supplementary Notes 1 to 5, further including:

a sensor information acquisition means configured to acquire sensor information related to a structure from a sensor information acquisition device; and a state determination means configured to determine a first state of the structure using the sensor information, wherein the displacement clipping means clips, from the first state, a second state related to at least one of the first ground surface displacement and the second ground surface displacement included in the first region, and the output means outputs the second state in association with at least one of the first ground surface displacement and the second ground surface displacement.

(Supplementary Note 7)

A displacement output system including:

the displacement output device according to any one of Supplementary Notes 1 to 5;

the synthetic aperture radar that outputs the first ground surface displacement to the displacement output device; and a display device that displays at least one of the first ground surface displacement and the second ground surface displacement output by the displacement output device.

(Supplementary Note 8)

The displacement output system according to Supplementary Note 7, wherein the display device highlights at least one of the first ground surface displacement and the second ground surface displacement satisfying a predetermined condition.

(Supplementary Note 9)

A displacement output system including:

The displacement output device according to Supplementary Note 6;

the synthetic aperture radar that outputs the first ground surface displacement to the displacement output device;

a sensor information acquisition device that outputs the sensor information to the displacement output device; and a display device that displays at least one of the first ground surface displacement and the second ground surface displacement output by the displacement output device and the second state in association with each other.

(Supplementary Note 10)

The displacement output system according to Supplementary Note 9, wherein the display device displays the second state using at least one of a figure and a symbol.

(Supplementary Note 11)

The displacement output system according to Supplementary Note 9 or 10, wherein the display device displays the second state in a vicinity of or in superposition with at least part of display of at least one of the first ground surface displacement and the second ground surface displacement.

(Supplementary Note 12)

The displacement output system according to any one of Supplementary Notes 9 to 11, wherein the display device changes display in accordance with a combination of at least one of the first ground surface displacement and the second ground surface displacement and the second state.

(Supplementary Note 13)

The displacement output system according to any one of Supplementary Notes 9 to 12, wherein the display device changes display of the second state in accordance with an instruction from a user.

(Supplementary Note 14)

The displacement output system according to any one of Supplementary Notes 9 to 13, wherein the displacement output device outputs information related to the second state, and the display device displays information related to the second state in accordance with an instruction from a user.

(Supplementary Note 15)

The displacement output system according to Supplementary Note 14, wherein the display device displays information related to the second state using three-dimensional computer graphics or a perspective drawing method.

(Supplementary Note 16)

A displacement output method including:

Acquiring a first ground surface displacement at a first point from a synthetic aperture radar;

estimating a second ground surface displacement at a second point different from the first point using the acquired first ground surface displacement;

clipping at least one of the first ground surface displacement and the second ground surface displacement included in a preset first region from the first ground surface displacement and the second ground surface displacement; and outputting at least one of the first ground surface displacement and the second ground surface displacement included in the first region.

(Supplementary Note 17)

The displacement output method according to Supplementary Note 16, further including:

generating a third ground surface displacement of a section including at least one of the first point and the second point using the first ground surface displacement and the second ground surface displacement;

clipping, from the third ground surface displacement, a fourth ground surface displacement of a second region included in the section in the first region; and outputting the fourth ground surface displacement of the second region.

(Supplementary Note 18)

The displacement output method according to Supplementary Note 17, further including:

setting the section in accordance with at least one of information about a structure to be determined, spatial resolution of the synthetic aperture radar, an instruction from a user, a predetermined rule, a predetermined condition, and the first region.

(Supplementary Note 19)

The displacement output method according to Supplementary Note 18, further including:

using, as a predetermined condition, a condition related to at least one of the number or a ratio of the first points or the number or a ratio of the second points included in the section.

(Supplementary Note 20)

The displacement output method according to any one of Supplementary Notes 16 to 19, further including:

setting the first region in accordance with at least one of an instruction from a user and predetermined information.

(Supplementary Note 21)

The displacement output method according to any one of Supplementary Notes 16 to 20, further including:

acquiring sensor information related to a structure from a sensor information acquisition device; and determining a first state of the structure using the sensor information;

clipping, from the first state, a second state related to at least one of the first ground surface displacement and the second ground surface displacement included in the first region; and outputting the second state in association with at least one of the first ground surface displacement and the second ground surface displacement.

(Supplementary Note 22)

A displacement output method including:

executing, by a displacement output device, the displacement output method according to any one of Supplementary Notes 16 to 20;

outputting, by the synthetic aperture radar, the first ground surface displacement to the displacement output device; and displaying, by a display device, at least one of the first ground surface displacement and the second ground surface displacement output by the displacement output device.

(Supplementary Note 23)

The displacement output method according to Supplementary Note 22, further including:

highlighting, by the display device, at least one of the first ground surface displacement and the second ground surface displacement satisfying a predetermined condition.

(Supplementary Note 24)

A displacement output method including:

executing, by the displacement output device, the displacement output method according to Supplementary Note 21;

outputting, by the synthetic aperture radar, the first ground surface displacement to the displacement output device;

outputting, by a sensor information acquisition device, the sensor information to the displacement output device; and displaying, by a display device, at least one of the first ground surface displacement and the second ground surface displacement output by the displacement output device and the second state in association with each other.

(Supplementary Note 25)

The displacement output method according to Supplementary Note 24, further including:

displaying, by the display device, the second state using at least one of a figure and a symbol.

(Supplementary Note 26)

The displacement output method according to Supplementary Note 24 or 25, further including:

displaying, by the display device, the second state in a vicinity of or in superposition with at least part of display of at least one of the first ground surface displacement and the second ground surface displacement.

(Supplementary Note 27)

The displacement output method according to any one of Supplementary Notes 24 to 26, further including:

changing, by the display device, display in accordance with a combination of at least one of the first ground surface displacement and the second ground surface displacement and the second state.

(Supplementary Note 28)

The displacement output method according to any one of Supplementary Notes 24 to 27, further including:

changing, by the display device, display of the second state in accordance with an instruction from a user.

(Supplementary Note 29)

The displacement output method according to any one of Supplementary Notes 24 to 28, further including:

outputting, by the displacement output device, information related to the second state; and displaying, by the display device, information related to the second state in accordance with an instruction from a user.

(Supplementary Note 30)

The displacement output method according to Supplementary Note 29, wherein displaying, by the display device, information related to the second state using three-dimensional computer graphics or a perspective drawing method.

(Supplementary Note 31)

A recording medium that records a program for causing a computer to execute:

a process of acquiring a first ground surface displacement at a first point from a synthetic aperture radar;

a process of estimating a second ground surface displacement at a second point different from the first point using the acquired first ground surface displacement;

a process of clipping at least one of the first ground surface displacement and the second ground surface displacement included in a preset first region from the first ground surface displacement and the second ground surface displacement; and a process of outputting at least one of the first ground surface displacement and the second ground surface displacement included in the first region.

(Supplementary Note 32)

The recording medium according to Supplementary Note 31 that records a program for causing a computer to further execute:

a process of generating a third ground surface displacement of a section including at least one of the first point and the second point using the first ground surface displacement and the second ground surface displacement;

a process of clipping, from the third ground surface displacement, a fourth ground surface displacement of a second region included in the section in the first region; and a process of outputting the fourth ground surface displacement of the second region.

(Supplementary Note 33)

The recording medium according to Supplementary Note 32 that records a program for causing a computer to further execute:

a process of setting the section in accordance with at least one of information about a structure to be determined, spatial resolution of the synthetic aperture radar, an instruction from a user, a predetermined rule, a predetermined condition, and the first region.

(Supplementary Note 34)

The recording medium according to Supplementary Note 33 that records a program for causing a computer to further execute:

a process of using, as a predetermined condition, a condition related to at least one of the number or a ratio of the first points or the number or a ratio of the second points included in the section.

(Supplementary Note 35)

The recording medium according to any one of Supplementary Notes 31 to 34 that records a program for causing a computer to further execute:

a process of setting the first region in accordance with at least one of an instruction from a user and predetermined information.

(Supplementary Note 36)

The recording medium according to any one of Supplementary Notes 31 to 35 that records a program for causing a computer to further execute:

a process of acquiring sensor information related to a structure from a sensor information acquisition device;

a process of determining a first state of the structure using the sensor information;

a process of the clipping includes clipping, from the first state, a second state related to at least one of the first ground surface displacement and the second ground surface displacement included in the first region; and a process of the outputting including outputting the second state in association with at least one of the first ground surface displacement and the second ground surface displacement.

Although the present invention is described above with reference to the example embodiments, the present invention is not limited to the above example embodiments. It will be understood by those of ordinary skill that various changes in form and details may be made therein without departing from the spirit and scope of the present invention as defined by the claims.

REFERENCE SIGNS LIST

10 displacement output device
12 displacement output device
13 displacement output device
20 SAR
30 display device
40 section indication device
50 region indication device
60 sensor information acquisition device
70 displacement output system
72 displacement output system
73 displacement output system
110 displacement acquisition unit
120 displacement estimation unit
130 section displacement generation unit
140 displacement clipping unit
142 displacement clipping unit
150 output unit
152 output unit
160 section storage unit
170 region storage unit
180 section setting unit
190 region setting unit
310 sensor information acquisition unit
320 state determination unit
610 CPU
620 ROM
630 RAM
640 storage device
650 NIC
690 recording medium
810 computer
812 computer
820 SAR system
830 terminal device
860 drive recorder
865 fixed camera
880 network
890 vehicle
895 building

What is claimed is:

1. A displacement output device comprising:
a memory; and
at least one processor coupled to the memory,
the processor performing operations, the operations comprising:
acquiring a first ground surface displacement at a first point from a synthetic aperture radar;
estimating a second ground surface displacement at a second point different from the first point using the acquired first ground surface displacement;
clipping at least one of the first ground surface displacement and the second ground surface displacement included in a preset first region from the first ground surface displacement and the second ground surface displacement, the preset first region being a region extracted by excluding at least one of a region where a building requiring privacy protection is constructed and a region where provision of information is legally restricted; and
outputting at least one of the first ground surface displacement and the second ground surface displacement included in the first region.

2. The displacement output device according to claim 1, wherein the operations further comprise:
generating a third ground surface displacement of a section including at least one of the first point and the second point using the first ground surface displacement and the second ground surface displacement, the section having a side length that is a predetermined multiple of a spatial resolution of the synthetic aperture radar;
clipping, from the third ground surface displacement, a fourth ground surface displacement of a second region included in the section in the first region; and
outputting the fourth ground surface displacement of the second region.

3. The displacement output device according to claim 2, wherein the operations further comprise:
setting the section in accordance with at least one of information about a structure to be determined, the spatial resolution of the synthetic aperture radar, an instruction from a user, a predetermined rule, a predetermined condition, and the first region.

4. The displacement output device according to claim 3, wherein the operations further comprise:
using, as a predetermined condition, a condition related to at least one of the number or a ratio of the first points or the number or a ratio of the second points included in the section.

5. The displacement output device according to claim 1, wherein the operations further comprise:
setting the first region in accordance with at least one of an instruction from a user and predetermined information.

6. The displacement output device according to claim 1, wherein the operations further comprise:
acquiring sensor information related to a structure from a sensor information acquisition device;
determining a first state of the structure using the sensor information;
clipping, from the first state, a second state related to at least one of the first ground surface displacement and the second ground surface displacement included in the first region; and
outputting the second state in association with at least one of the first ground surface displacement and the second ground surface displacement.

7. A displacement output method comprising:
acquiring a first ground surface displacement at a first point from a synthetic aperture radar;
estimating a second ground surface displacement at a second point different from the first point using the acquired first ground surface displacement;
clipping at least one of the first ground surface displacement and the second ground surface displacement included in a preset first region from the first ground surface displacement and the second ground surface displacement, the preset first region being a region extracted by excluding at least one of a region where a building requiring privacy protection is constructed and a region where provision of information is legally restricted; and outputting at least one of the first ground surface displacement and the second ground surface displacement included in the first region.

8. The displacement output method according to claim 7, further comprising:

generating a third ground surface displacement of a section including at least one of the first point and the second point using the first ground surface displacement and the second ground surface displacement, the section having a side length that is a predetermined multiple of a spatial resolution of the synthetic aperture radar;

clipping, from the third ground surface displacement, a fourth ground surface displacement of a second region included in the section in the first region; and outputting the fourth ground surface displacement of the second region.

9. The displacement output method according to claim 8, further comprising:

setting the section in accordance with at least one of information about a structure to be determined, the spatial resolution of the synthetic aperture radar, an instruction from a user, a predetermined rule, a predetermined condition, and the first region.

10. The displacement output method according to claim 9, further comprising:

using, as a predetermined condition, a condition related to at least one of the number or a ratio of the first points or the number or a ratio of the second points included in the section.

11. The displacement output method according to claim 7, further comprising:

setting the first region in accordance with at least one of an instruction from a user and predetermined information.

12. The displacement output method according to claim 7, further comprising:

acquiring sensor information related to a structure from a sensor information acquisition device; and determining a first state of the structure using the sensor information;

clipping, from the first state, a second state related to at least one of the first ground surface displacement and the second ground surface displacement included in the first region; and outputting the second state in association with at least one of the first ground surface displacement and the second ground surface displacement.

13. A non-transitory computer-readable recording medium that records a program for causing a computer to perform a method, the method comprising:

acquiring a first ground surface displacement at a first point from a synthetic aperture radar;

estimating a second ground surface displacement at a second point different from the first point using the acquired first ground surface displacement;

clipping at least one of the first ground surface displacement and the second ground surface displacement included in a preset first region from the first ground surface displacement and the second ground surface displacement, the preset first region being a region extracted by excluding at least one of a region where a building requiring privacy protection is constructed and a region where provision of information is legally restricted; and outputting at least one of the first ground surface displacement and the second ground surface displacement included in the first region.

14. The recording medium according to claim 13 that records a program for causing a computer to further perform a method, the method comprising:

generating a third ground surface displacement of a section including at least one of the first point and the second point using the first ground surface displacement and the second ground surface displacement, the section having a side length that is a predetermined multiple of the spatial resolution of the synthetic aperture radar;

clipping, from the third ground surface displacement, a fourth ground surface displacement of a second region included in the section in the first region; and outputting the fourth ground surface displacement of the second region.

15. The recording medium according to claim 14 that records a program for causing a computer to further perform a method, the method comprising:

setting the section in accordance with at least one of information about a structure to be determined, the spatial resolution of the synthetic aperture radar, an instruction from a user, a predetermined rule, a predetermined condition, and the first region.

16. The recording medium according to claim 15 that records a program for causing a computer to further perform a method, the method comprising:

using, as a predetermined condition, a condition related to at least one of the number or a ratio of the first points or the number or a ratio of the second points included in the section.

17. The recording medium according to claim 13, that records a program for causing a computer to further perform a method, the method comprising:

setting the first region in accordance with at least one of an instruction from a user and predetermined information.

18. The recording medium according to claim 13, that records a program for causing a computer to further perform a method, the method comprising:

acquiring sensor information related to a structure from a sensor information acquisition device;

determining a first state of the structure using the sensor information;

clipping, from the first state, a second state related to at least one of the first ground surface displacement and the second ground surface displacement included in the first region; and outputting the second state in association with at least one of the first ground surface displacement and the second ground surface displacement.

* * * * *